(12) United States Patent
Muratani et al.

(10) Patent No.: US 8,395,849 B2
(45) Date of Patent: Mar. 12, 2013

(54) IMAGING LENS, OPTICAL APPARATUS EQUIPPED WITH IMAGING LENS AND METHOD FOR MANUFACTURING IMAGING LENS

(75) Inventors: Mami Muratani, Tokyo (JP); Haruo Sato, Kawaguchi (JP); Motohisa Mouri, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/238,285

(22) Filed: Sep. 21, 2011

(65) Prior Publication Data
US 2012/0127590 A1 May 24, 2012

(30) Foreign Application Priority Data
Sep. 22, 2010 (JP) ................................. 2010-211657

(51) Int. Cl.
G02B 15/14 (2006.01)

(52) U.S. Cl. ....................................... 359/689; 359/900

(58) Field of Classification Search .................. 359/689, 359/900
See application file for complete search history.

(56) References Cited

U.S. PATENT DOCUMENTS
4,772,108 A 9/1988 Sugiyama

FOREIGN PATENT DOCUMENTS
| JP | 60-188918 A | 9/1985 |
| JP | 62-160412 A | 7/1987 |
| JP | 07-181390 A | 7/1995 |

*Primary Examiner* — Jack Dinh
(74) *Attorney, Agent, or Firm* — Miles and Stockbridge P.C.

(57) ABSTRACT

An imaging lens SL mounted in a single lens reflex digital camera 1 is composed of, in order from an object side, a first lens group G1 having negative refractive power, a second lens group G2 having positive refractive power, and a third lens group G3 having negative refractive power. Upon focusing on a near-distance object from an infinitely distant object, a configuration is that at least any one of the first lens group G1 and the second lens group G2 is moved to the object side to vary a distance between the first lens group G1 and the second lens group G2. Accordingly, a downsized imaging lens having a small moving amount upon shooting a close range object, in which various aberrations are well corrected is provided.

18 Claims, 16 Drawing Sheets

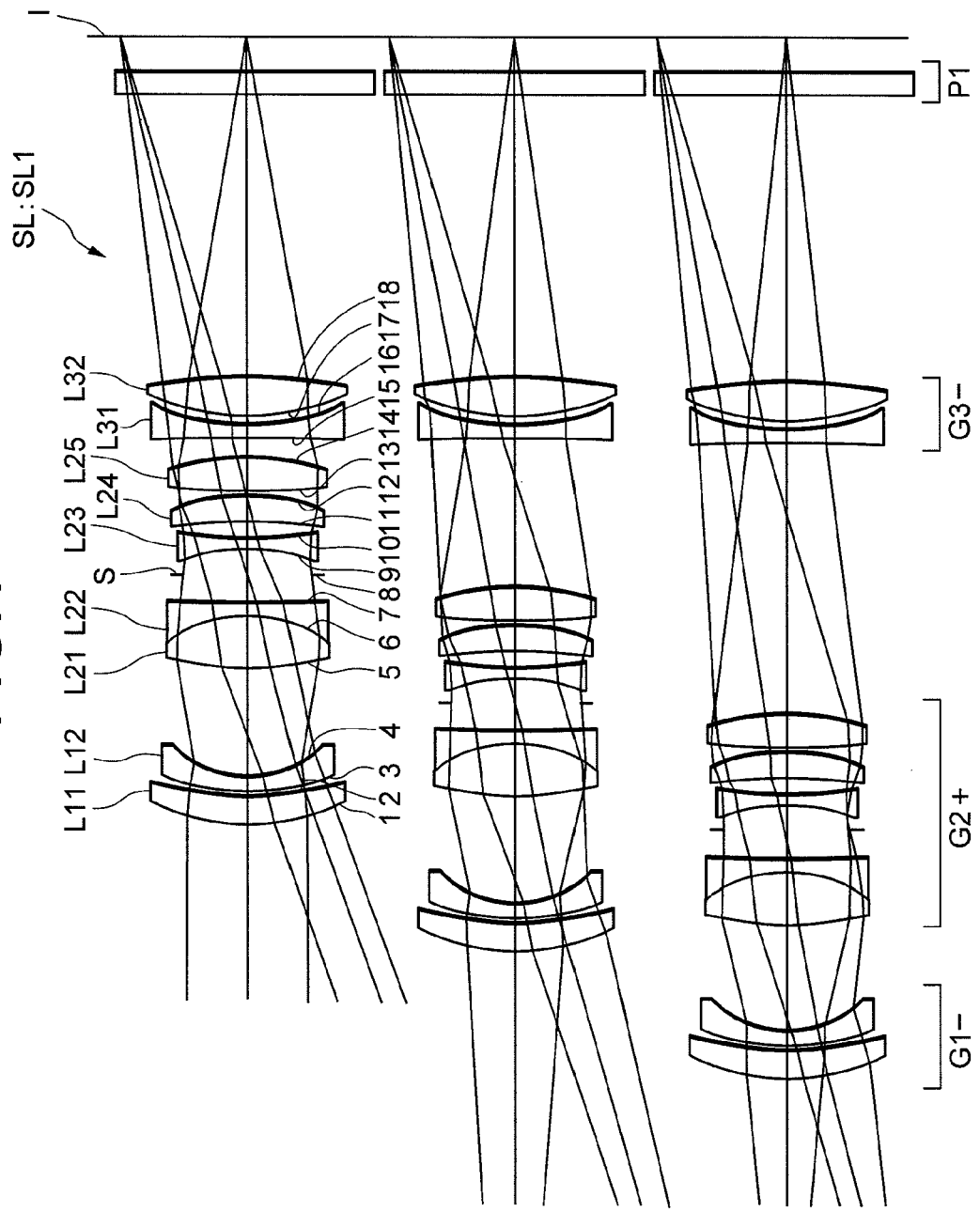

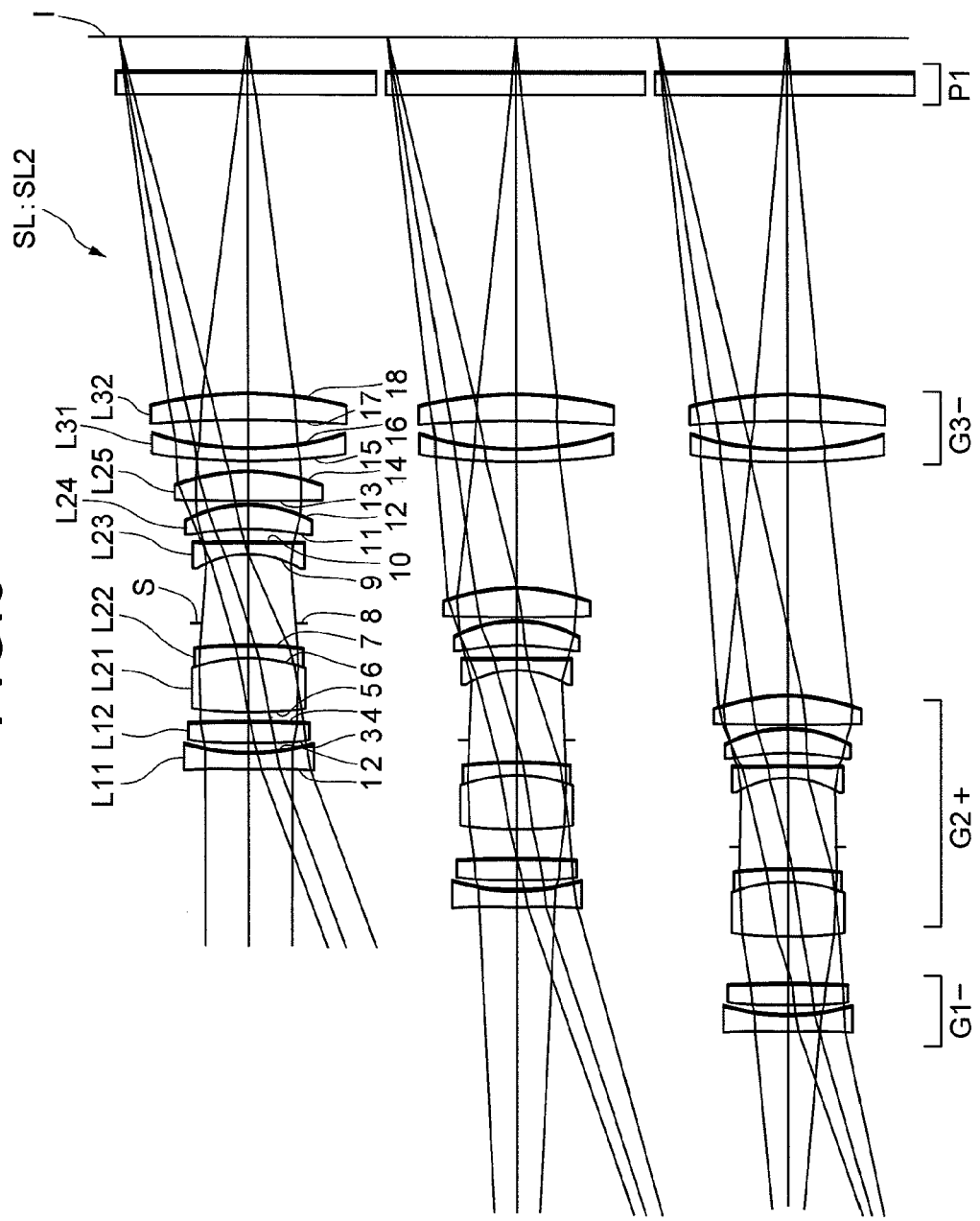

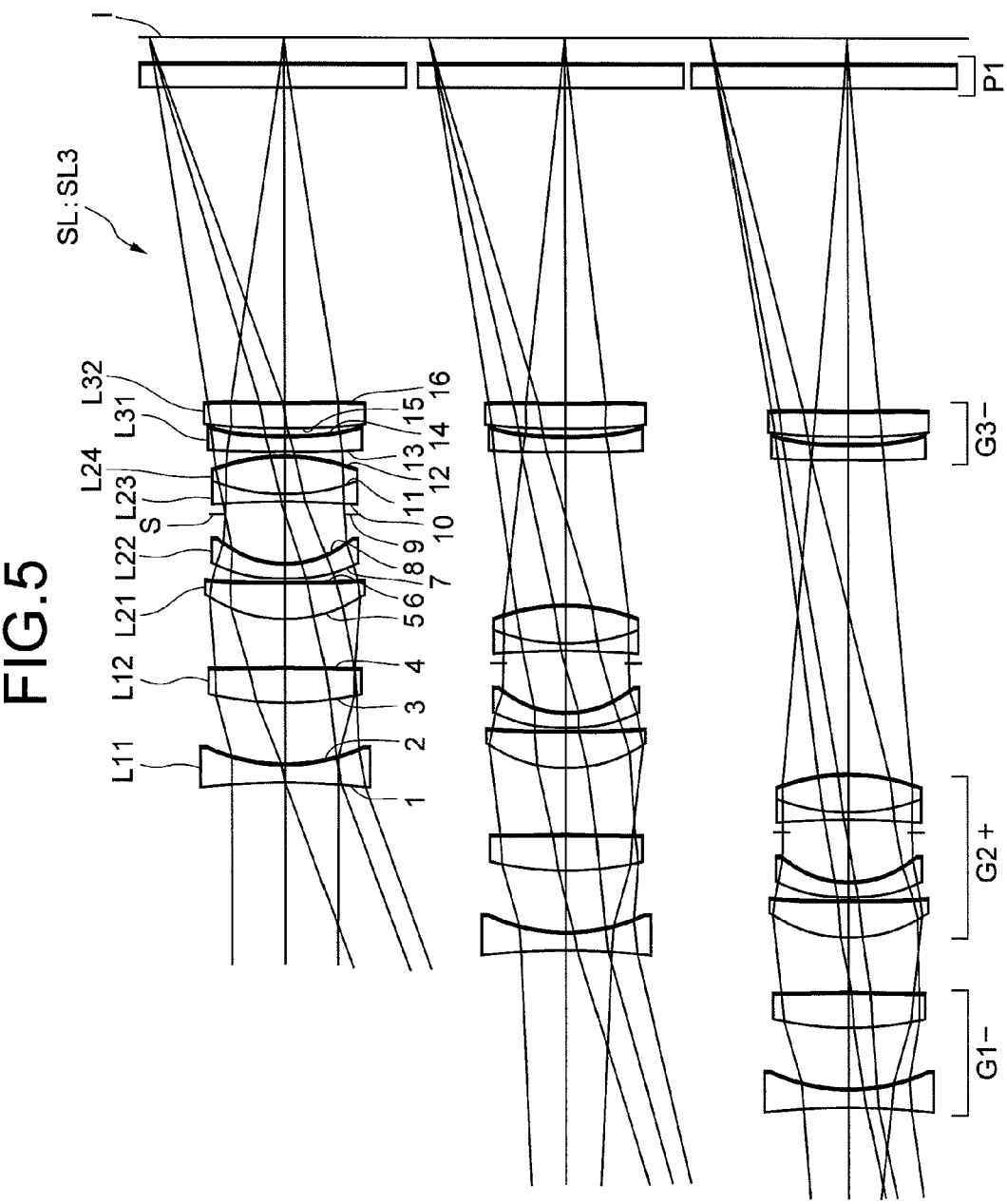

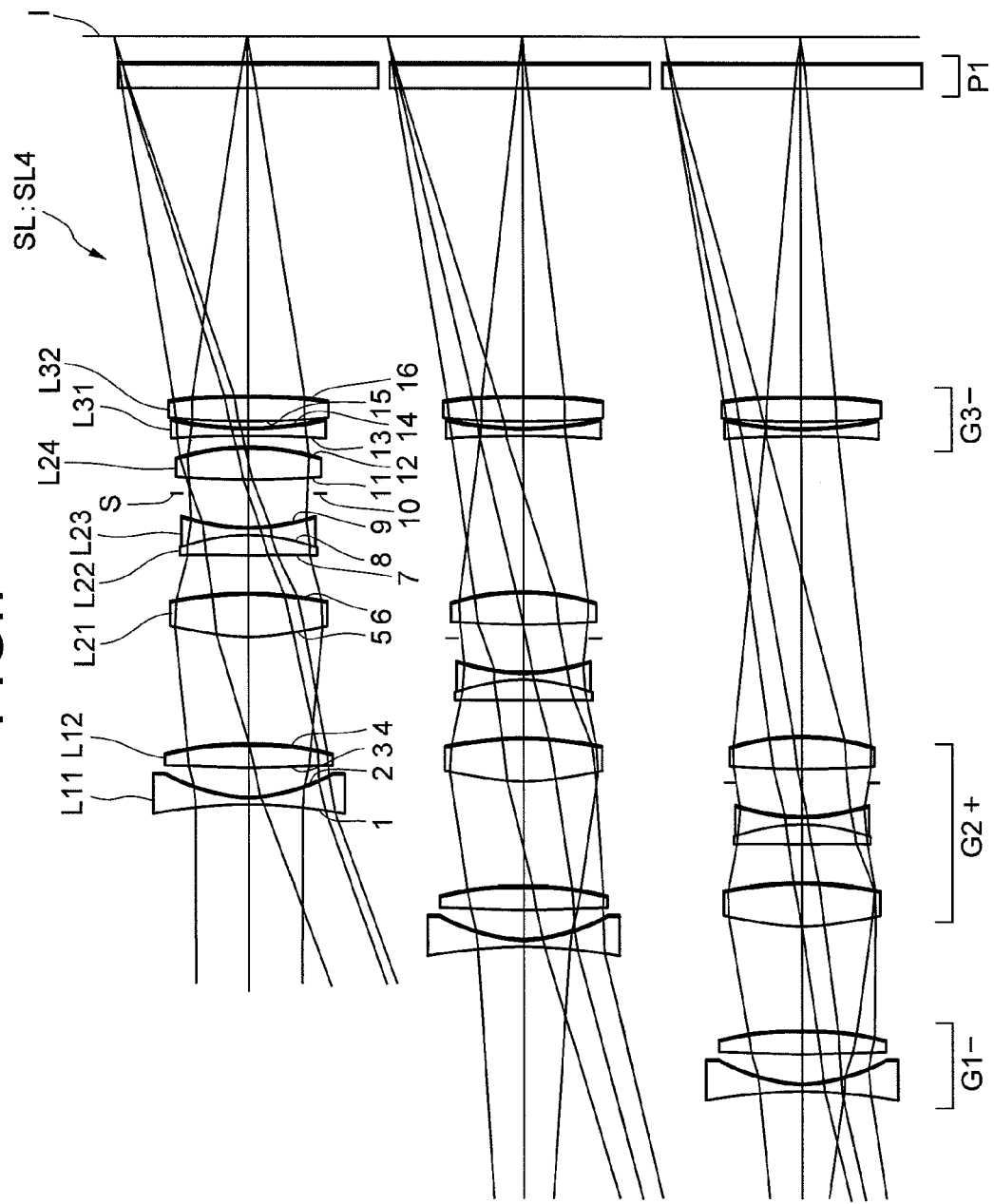

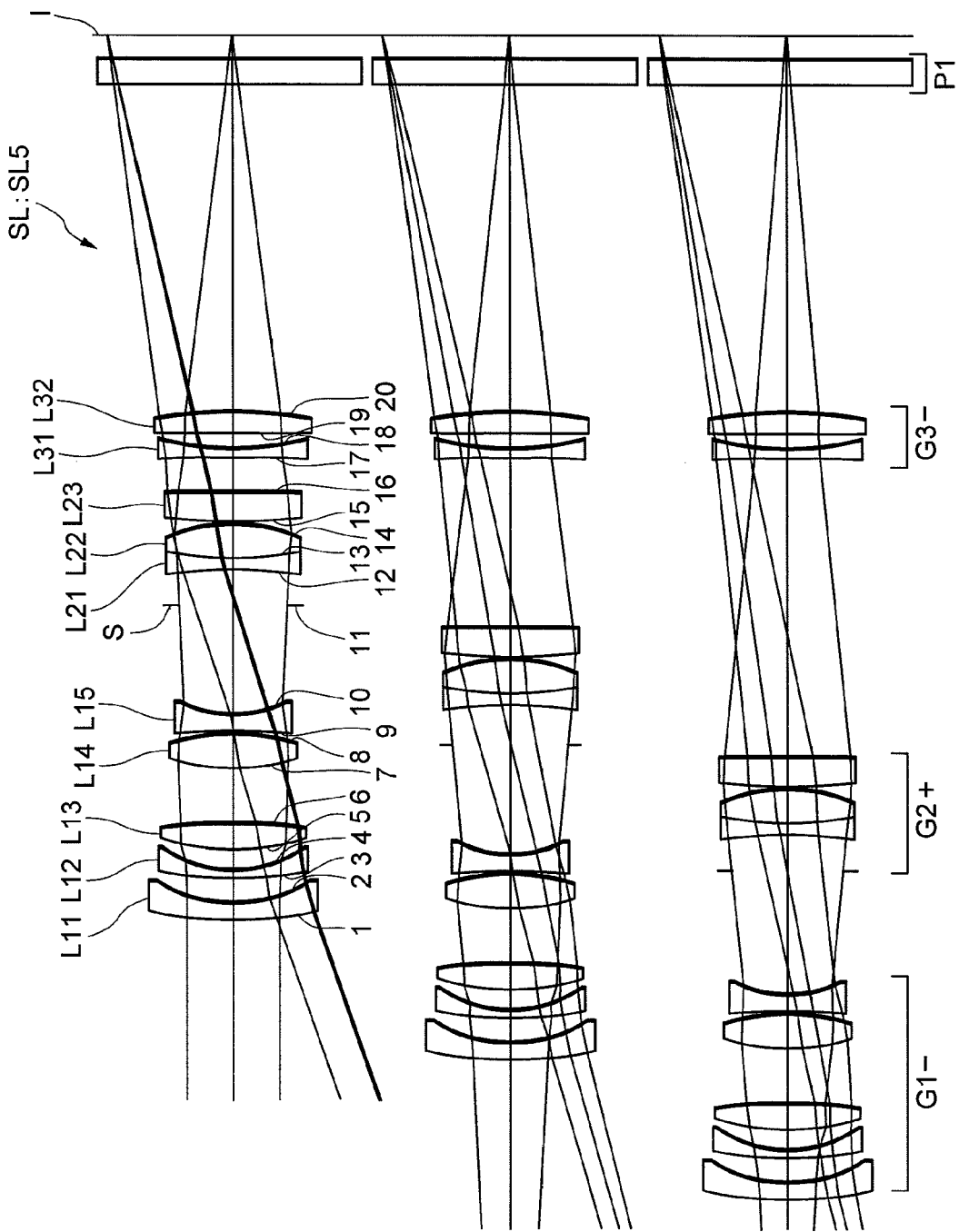

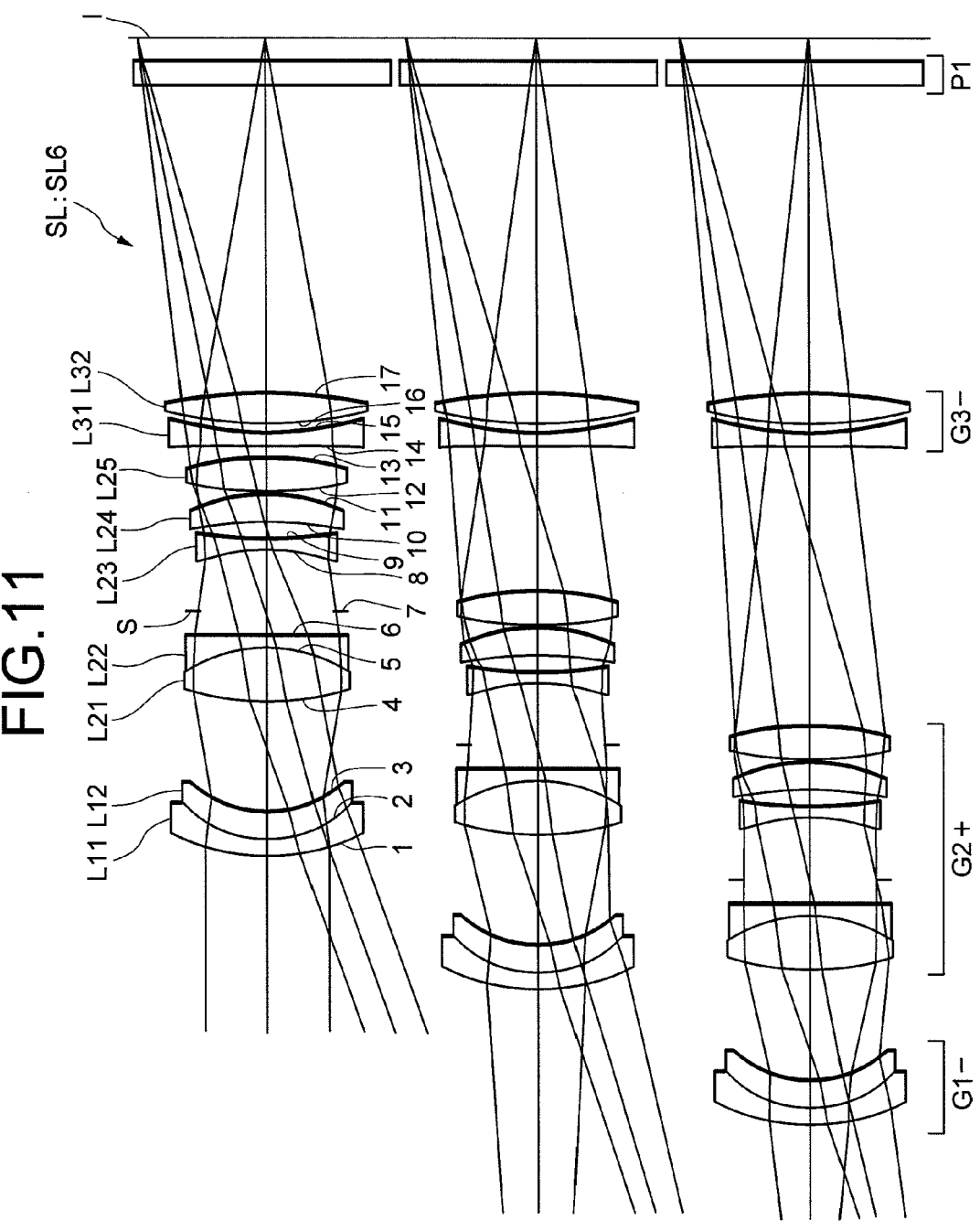

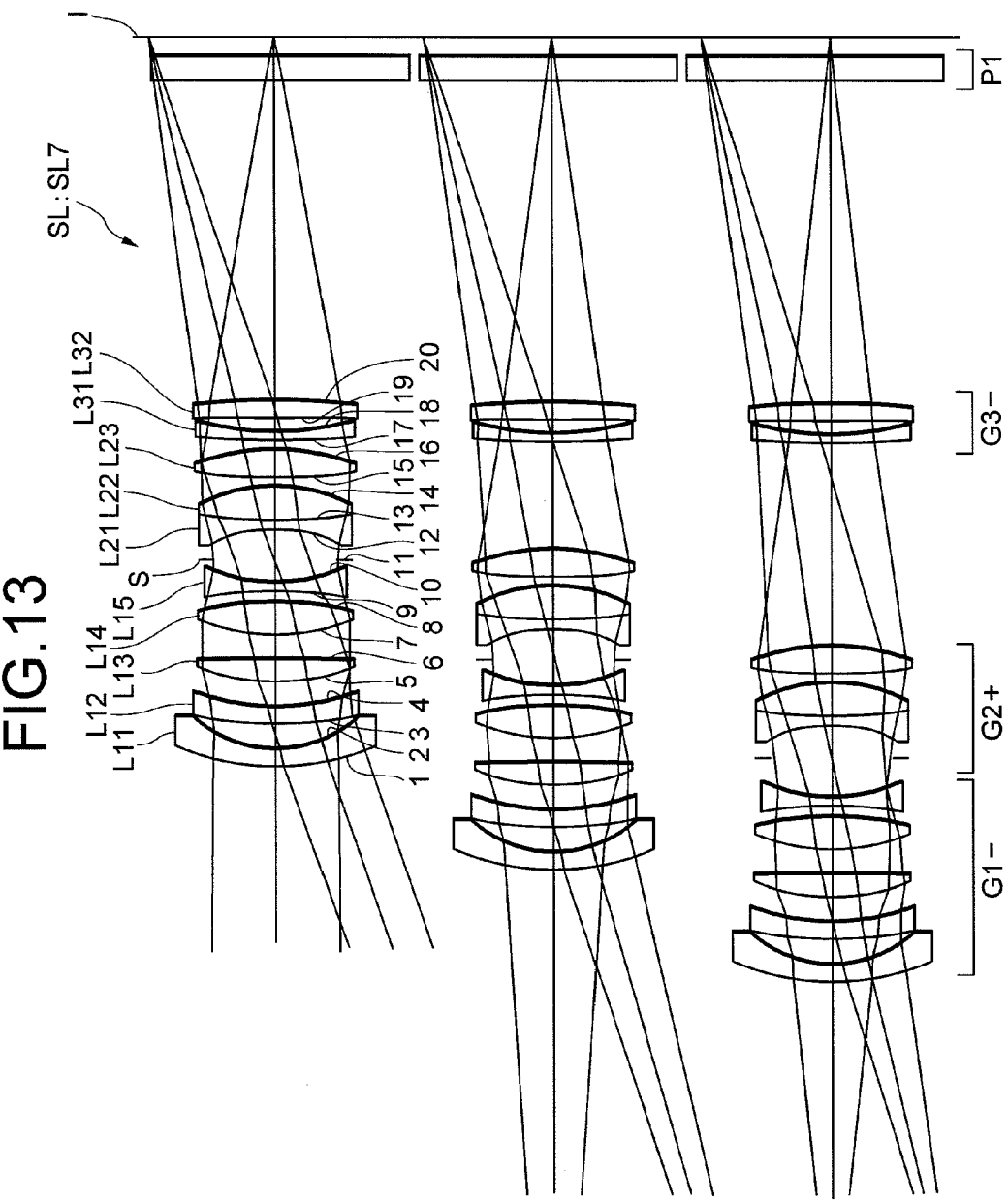

IMAGING LENS, OPTICAL APPARATUS EQUIPPED WITH IMAGING LENS AND METHOD FOR MANUFACTURING IMAGING LENS

The disclosure of the following priority application is herein incorporated by reference:

Japanese Patent Application No. 2010-211657 filed on Sep. 22, 2010.

BACKGROUND OF THE INVENTION

1. Field of the Invention

The present invention relates to an imaging lens, an optical apparatus equipped with the imaging lens, and a method for manufacturing the imaging lens.

2. Related Background Art

A macro (micro) lens has hitherto been proposed, which is capable of performing close range photography from an infinitely distant object up to a shooting magnification on the order of $-1.0$ (refer to, e.g., Japanese Patent Application Laid-Open No. 7-181390).

According to the prior art exemplified by Japanese Patent Application Laid-Open No. 7-181390, however, there is a large moving amount of especially a first lens group among the respective lens groups upon focusing, and it is difficult due to this large moving amount to be used for an interchangeable lens equipped with a drive mechanism within a lens barrel, which is conceived as a mainstream type of lens at the present. Moreover, in the case of desiring a length of the lens barrel to be kept short upon focusing on an infinitely distant object and desiring a small-sized and compact lens barrel as well, a large amount of lens extension is hard to build up a structure of the lens barrel. Moreover, in the case of reducing the moving amount of particularly the first lens group while accelerating the downsizing on the extension of the prior arts, it is difficult to control variations in spherical aberration and curvature of field due to focusing, and there is a necessity for further improvements.

SUMMARY OF THE INVENTION

It is an object of the present invention, which was devised in view of these problems, to provide a downsized imaging lens having a small moving amount upon shooting a close range object and getting various aberrations to be well corrected, an optical apparatus equipped with the imaging lens and a method for manufacturing the imaging lens.

According to a first aspect of the present invention, there is provided an imaging lens comprising, in order from an object side: a first lens group having negative refractive power; a second lens group having positive refractive power; and a third lens group having negative refractive power, upon focusing on a close object from an infinitely distant object, at least one of the first lens group and the second lens group being moved to the object side so that a distance between the first lens group and the second lens group varies, and the following conditional expressions (1) and (2) being satisfied:

$$0.5 \leq (-\beta) \tag{1}$$

$$0.81 < |X1|/f2 < 1.20 \tag{2}$$

where β denotes a shooting magnification upon focusing on the closest object, X1 is a moving amount of the first lens group, which comes to the maximum when focusing varies from an infinitely-distant-object focusing state to a life-size shooting magnification state, and f2 is a focal length of the second lens group.

In the first aspect of the present invention, it is preferable that the imaging lens satisfies the following conditional expression (3):

$$0.22 < f2/(-f1) < 0.90 \tag{3}$$

where f1 denotes a focal length of the first lens group.

In the first aspect of the present invention, it is preferable that the imaging lens satisfies the following conditional expression (4):

$$0.20 < f/TL < 0.60 \tag{4}$$

where f denotes a focal length of the whole system upon focusing on an infinitely distant object, and TL is a total lens length upon focusing on an infinitely distant object.

In the first aspect of the present invention, it is preferable that the imaging lens satisfies the following conditional expression (5):

$$0.20 < (-f1)/f < 3.00 \tag{5}$$

where f1 denotes a focal length of the first lens group G1, and f denotes a focal length of the whole system upon focusing on an infinitely distant object.

In the first aspect of the present invention, it is preferable that the imaging lens satisfies the following conditional expression (6):

$$2.0 < (-f3)/f < 50.0 \tag{6}$$

where f3 denotes a focal length of the third lens group G3, and f is a focal length of the whole system upon focusing on an infinitely distant object.

In the first aspect of the present invention, it is preferable that said imaging lens satisfies the following conditional expression (7):

$$0.40 < f2/f < 1.50 \tag{7}$$

where f2 denotes a focal length of the second lens group G2, and f denotes a focal length of the whole system upon focusing on an infinitely distant object.

In the first aspect of the present invention, it is preferable that said imaging lens satisfies the following conditional expression (8):

$$0.40 < |X1|/f < 1.50 \tag{8}$$

where f denotes a focal length of the whole system upon focusing on an infinitely distant object.

In the first aspect of the present invention, it is preferable that said first lens group includes at least one negative lens and at least one positive lens and is composed of two through five of lenses on the whole.

In the first aspect of the present invention, it is preferable that the first lens group is configured so that at least one of said negative lenses has a concave surface facing an image side.

In the first aspect of the present invention, it is preferable that the third lens group is fixed upon focusing.

According to a second aspect of the present invention, there is provided an optical apparatus equipped with the imaging lens according to the fires aspect.

According to a third aspect of the present invention, there is provided a method for manufacturing an imaging lens including, in order from an object side, a first lens group having negative refractive power, a second lens group having positive refractive power, and a third lens group having negative refractive power, the method comprising steps of: disposing at least one of the first lens group and the second lens group movably to the object side upon focusing from an infinitely distant object to a close object such that a distance between the first lens group and the second lens group varies; and disposing each lens group with satisfying the following conditional expressions (1) and (2):

$$0.5 \leq (-\beta) \quad (1)$$

$$0.81 < |X1|/f2 < 1.20 \quad (2)$$

where β denotes a shooting magnification upon focusing on the nearest object, X1 denotes a moving amount of the first lens group, which comes to the maximum when focusing varies from an infinitely-distant-object focusing state to a life-size-shooting-magnification state, and f2 is a focal length of the second lens group G2.

It is feasible to provide, when configuring the imaging lens, the optical apparatus including the imaging lens and the method for manufacturing an imaging lens in the way described above, the downsized imaging lens suited to the imaging apparatus such as the single lens reflex camera, having an absolute value of a shooting magnification that is equal to or larger than 0.5, requiring a small moving amount upon shooting a close range photograph and getting the various aberrations to be well corrected.

BRIEF DESCRIPTION OF THE DRAWINGS

FIG. 1 is a sectional view showing a configuration of an imaging lens according to Example 1.

FIGS. 2A, 2B and 2C are diagrams of various aberrations in Example 1, in which FIG. 2A is the diagram of the various aberrations in an infinite-distance focusing state, FIG. 2B is a diagram of the various aberrations in a quasi-life-size-shooting-magnification (−0.5) state, and FIG. 2C is a diagram of the various aberrations in a life-size-shooting-magnification (−1.0) state.

FIG. 3 is a sectional view showing a configuration of the imaging lens according to Example 2.

FIGS. 4A, 4B and 4C are diagrams of the various aberrations in Example 2, in which FIG. 4A is a diagram of the various aberrations in the infinite-distance focusing state, and FIG. 4B is a diagram of the various aberrations in the quasi-life-size-shooting-magnification (−0.5) state, and FIG. 4C is a diagram of the various aberrations according to the life-size-shooting-magnification (−1.0) state.

FIG. 5 is a sectional view showing a configuration of the imaging lens according to Example 3.

FIGS. 6A, 6B and 6C are diagrams of the various aberrations in Example 3, in which FIG. 6A is a diagram of the various aberrations in the infinite-distance focusing state, FIG. 6B is a diagram of the various aberrations in the quasi-life-size-shooting-magnification (−0.5) state, and FIG. 6C is a diagram of the various aberrations in the life-size-shooting-magnification (−1.0) state.

FIG. 7 is a sectional view showing a configuration of the imaging lens according to Example 4.

FIGS. 8A, 8B and 8C are diagrams of the various aberrations in Example 4, in which FIG. 8A is a diagram of the various aberrations in the infinite-distance focusing state, FIG. 8B is a diagram of the various aberrations in the quasi-life-size-shooting-magnification (−0.5) state, and FIG. 8C is a diagram of the various aberrations in the life-size-shooting-magnification (−1.0) state.

FIG. 9 is a sectional view showing a configuration of the imaging lens according to Example 5.

FIGS. 10A, 10B and 10C are diagrams of the various aberrations in Example 5, in which FIG. 10A is a diagram of the various aberrations in the infinite-distance focusing state, FIG. 10B is a diagram of the various aberrations in the quasi-life-size-shooting-magnification (−0.5) state, and FIG. 10C is a diagram of the various aberrations in the life-size-shooting-magnification (−1.0) state.

FIG. 11 is a sectional view showing a configuration of the imaging lens according to Example 6.

FIGS. 12A, 12B and 12C are diagrams of the various aberrations in Example 6, in which FIG. 12A is a diagram of the various aberrations in the infinite-distance focusing state, FIG. 12B is a diagram of the various aberrations in the quasi-life-size-shooting-magnification (−0.5) state, and FIG. 12C is a diagram of the various aberrations in the life-size-shooting-magnification (−1.0) state.

FIG. 13 is a sectional view showing a configuration of the imaging lens according to Example 7.

FIGS. 14A, 14B and 14C are diagrams of the various aberrations in Example 7, in which FIG. 14A is a diagram of the various aberrations in the infinite-distance focusing state, FIG. 14B is a diagram of the various aberrations in the quasi-life-size-shooting-magnification (−0.5) state, and FIG. 14C is a diagram of the various aberrations in the life-size-shooting-magnification (−1.0) state.

DESCRIPTION OF THE MOST PREFERRED EMBODIMENT

Figure 2A:
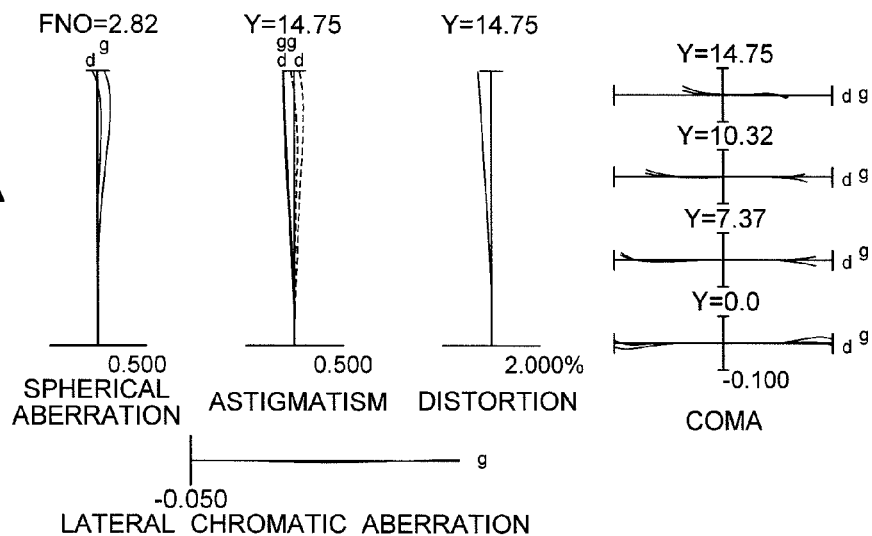

A preferred embodiment of the present invention will hereinafter be described with reference to accompanying drawings. As shown in FIG. 1, an imaging lens SL includes, in order from an object side, a first lens group G1 having negative refractive power, a second lens group G2 having positive refractive power, and a third lens group G3 having positive refractive power, in which the first lens group G1 having negative refractive power is added on the object side of a telephoto type optical system composed of the second lens group G2 and the third lens group G3. Namely, the first lens group G1 is given an effect of a wide converter, thereby adjusting a focal length of the whole system and providing a sufficient angle of view. Further, the first lens group G1 having negative refractive power is configured to be movable and to become a part of a focusing lens group, thereby enabling a moving amount to be reduced and scheming to simplify a lens barrel.

Conditions for configuring this type of imaging lens SL will hereinafter be described. The imaging lens SL according to the present embodiment satisfies the following conditional expression (1):

$$0.5 \leq (-\beta) \quad (1)$$

where β is a shooting magnification upon focusing on the closest object point. The imaging lens SL can ensure an absolute value of the shooting magnification that is equal to or larger than 0.5.

Conditional expression (1) is a conditional expression which specifies the shooting magnification upon focusing on the closest object point. Variations in close range aberrations, which are especially variations in curvature of field and spherical aberration, can be restrained by satisfying this conditional expression (1). When the value (−β) is falls below the lower limit of conditional expression (1), an effect of the lens as a macro lens cannot be exhibited, which is an undesirable point. Here, it is preferable in order to ensure the effects of the present embodiment that the lower limit of conditional expression (1) is set to 0.75. Moreover, it is preferable in order to further ensure the effects of the present embodiment that the lower limit of conditional expression (1) is set to 1.00.

Moreover, the imaging lens SL according to the present embodiment satisfies the following conditional expression (2):

$$0.81 < |X1|/f2 < 1.20 \quad (2)$$

where X1 is a moving amount of the first lens group G1, which comes to the maximum when focusing varies from an infinitely-distant-object focusing state to a life-size-shooting-magnification state, and f2 is a focal length of the second lens group G2.

Conditional expression (2) is an expression which specifies a ratio of the moving amount of the first lens group G1 to the focal length of the second lens group G2. The imaging lens SL is configured to restrain a total lens length and the moving amount of the first lens group G1, which is deeply related to a variation in the total lens length maximized upon shooting a close range object, and this conditional expression (2) is an expression which specifies an optimal range in which the moving amount of the first lens group G1 can be reduced while keeping proper the focal length of the second lens group G2. When the ratio |X1|/f2 is equal to or exceeds the upper limit of conditional expression (2), the imaging lens SL becomes long in its total lens length, heavy and time-consuming for extension of the lens. Otherwise, the shooting magnification is too small for the variation of the total lens length to build up the macro lens, which is an undesirable aspect. Here, it is preferable for ensuring the effects of the present embodiment that the upper limit of conditional expression (2) is set to 1.10, thereby enabling the aberrations to be well corrected. Moreover, it is more preferable for further ensuring the effects of the present embodiment that the upper limit of conditional expression (2) is set to 1.05, thereby enabling the effects of the present embodiment to be exhibited at the maximum. On the other hand, when the ratio |X1|/f2 is equal to or falls below the lower limit of conditional expression (2), though the variation in the total lens length is small, the power of the second lens group G2 is intensified to that degree, with the result that an aberration quantity increases. In particular, spherical aberration and coma are generated as the shooting magnification increases, and are difficult to be corrected, which is an undesirable aspect. Here, it is preferable for ensuring the effects of the present embodiment that the lower limit of conditional expression (2) is set to 0.82, thereby enabling the aberrations to be well corrected. Further, it is more preferable for further ensuring the effects of the present embodiment that the lower limit of conditional expression (2) is set to 0.85, thereby enabling the effects of the present embodiment to be exhibited at the maximum.

Moreover, it is desirable that the imaging lens SL according to the present embodiment satisfies the following conditional expression (3):

$$0.22 < f2/(-f1) < 0.90 \quad (3)$$

where f1 is a focal length of the first lens group G1, and f2 is the focal length of the second lens group G2.

Conditional expression (3) is an expression which specifies a ratio of the focal length of the second lens group G2 to the focal length of the first lens group G1. The present imaging lens SL is configured so that the third lens group G3 having negative refractive power receives the light beams converged by the first lens group G1 and the second lens group G2 for reducing the total lens length, however, if a rear side has a strong divergent component, a sufficient back focal length is not acquired. Such being the case, conditional expression (3) is established to keep a balance so as to enable the back focal length and an angle of view to be ensured in a way that gives an effect of a retrofocus by constructing the first lens group G1 as a negative lens group (the lens group having negative refractive power) and the second lens group G2 as a positive lens group (the lens group having positive refractive power). When the ratio f2/(-f1) is equal to or exceeds the upper limit of conditional expression (3), the power of the first lens group G1 is excessively intensified, and hence it is difficult to correct spherical aberration and an image plane, which is an undesirable aspect. Here, it is preferable for ensuring the effects of the present embodiment that the upper limit of conditional expression (3) is set to 0.8, thereby enabling the aberrations to be well corrected. Moreover, it is more preferable for further ensuring the effects of the present embodiment that the upper limit of conditional expression (3) is set to 0.7, thereby enabling the effects of the present embodiment to be exhibited at the maximum. On the other hand, when the ratio f2/(-f1) is equal to or falls below the lower limit of conditional expression (3), the focal length of the first lens group G1 becomes excessively long, resulting in an increase in moving amount upon focusing. Otherwise, the focal length of the second lens group G2 becomes excessively short, and spherical aberration becomes worse, which is an undesirable aspect. Here, it is preferable for ensuring the effects of the present embodiment that the lower limit of conditional expression (3) is set to 0.28, thereby enabling the aberrations to be well corrected. Further, it is more preferable for further ensuring the effects of the present embodiment that the lower limit of conditional expression (3) is set to 0.35. Still further, it is more preferable for further ensuring the effects of the present embodiment that the lower limit of conditional expression (3) is set to 0.40, thereby enabling the effects of the present embodiment to be exhibited at the maximum.

It is desirable that the imaging lens SL according to the present embodiment satisfies the following conditional expression (4):

$$0.20 < f/TL < 0.60 \quad (4)$$

where f is a focal length of the whole system upon focusing on an infinitely distant object, and TL is the total lens length upon focusing on an infinitely distant object. It should be noted that the total lens length TL represents a distance along an optical axis from a lens surface closest to the object side up to an image plane I.

Conditional expression (4) is an expression which specifies a proper ratio of the total lens length to the focal length upon focusing on an infinitely distant object to determine a length of the lens barrel when retracted. When the ratio f/TL is equal to or exceeds the upper limit of this conditional expression (4), the total lens length is too small with the difficulty of well correcting the aberrations all over the areas upon focusing from an infinitely distant object to a close object. The image plane at the closest shooting range becomes hard to be corrected, and coma cannot be corrected on the whole, which is an undesirable point. Here, it is preferable in order to ensure the effects of the present embodiment that the upper limit of conditional expression (4) is set to 0.55, thereby enabling the aberrations to be well corrected. Further, it is more preferable for further ensuring the effects of the present embodiment that the upper limit of conditional expression (4) is set to 0.50, thereby enabling the effects of the present embodiment to be exhibited at the maximum. On the other hand, when the ratio f/TL is equal to or falls below the lower limit of conditional expression (4), the focal length of the whole system is too short with respect to the total lens length, and the first lens group G1 and the third lens group G3 are separated from each other, with the result that the sufficient angle of view and ample brightness are hard to be ensured, which is an undesirable point. Here, it is preferable in order to ensure the effects of the present embodiment that the lower limit of conditional expression (4) is set to 0.25, thereby enabling the aberrations to be well corrected. Further, it is more preferable for further ensuring the effects of the present embodiment that the lower limit of conditional expression (4) is set to 0.30. Still further, it is more preferable for further ensuring the effects of the present embodiment that the lower limit of conditional expression (4) is set to 0.35, thereby enabling the effects of the present embodiment to be exhibited at the maximum.

Moreover, in the imaging lens SL according to the present embodiment, it is desirable that the following conditional expression (5) is satisfied:

$$0.20<(-f1)/f<3.00 \tag{5}$$

where f1 is the focal length of the first lens group G1, and f is the focal length of the whole system upon focusing on an infinitely distant object.

Conditional expression (5) is an expression which specifies proper refractive power of the first lens group G1 by use of the focal length of the whole system. When the ratio (−f1)/f is equal to or exceeds the upper limit of conditional expression (5), refractive power of the first lens group G1 having negative refractive power becomes weak, and hence the quantity of lens extension increases upon focusing on a close object with the result that a mechanical configuration within the lens barrel cannot be established. Moreover, if the refractive power of another lens group is intensified for reducing the moving amount, especially spherical aberration becomes worse, which is an undesirable point. Here, it is preferable for ensuring the effects of the present embodiment that the upper limit of conditional expression (5) is set to 2.8, thereby enabling the aberrations to be well corrected. Further, it is more preferable for further ensuring the effects of the present embodiment that the upper limit of conditional expression (5) is set to 2.50. Still further, it is more preferable for further ensuring the effects of the present embodiment that the upper limit of conditional expression (5) is set to 2.30, thereby enabling the effects of the present embodiment to be exhibited at the maximum. On the other hand, when the ratio (−f1)/f is equal to or falls below the lower limit of conditional expression (5), the refractive power of the first lens group G1 having negative refractive power becomes strong, so that there abruptly increase the variations in the aberrations upon focusing on a close object that are especially variations in curvature of field and astigmatism, which is an undesirable point. Moreover, distortion increases, which is also an undesirable point. Here, it is preferable in order to ensure the effects of the present embodiment that the lower limit of conditional expression (5) is set to 0.50, thereby enabling the aberrations to be well corrected. Further, it is more preferable for further ensuring the effects of the present embodiment that the lower limit of conditional expression (5) is set to 0.80. Still further, it is more preferable for further ensuring the effects of the present embodiment that the lower limit of conditional expression (5) is set to 1.00, thereby enabling the effects of the present embodiment to be exhibited at the maximum.

Furthermore, the third lens group G3 has negative refractive power, however, if negative refractive power of the rear lens group close to the image plane is strong, an image forming surface gets displaced in a minus direction, whereby the back focal length becomes short enough to disable the lens barrel from being built up. On the other hand, a lens of a telephoto system having a long focal length of the whole system has an allowance in back focal length in terms of its characteristics but tends to be long in total lens length, and therefore, in this case it is preferable to downsize the lens by intensifying the refractive power of the third lens group G3. Such being the case, the following conditional expression (6) gives a description of a proper ratio of the power of the third lens' group G3 to the focal length of the whole system.

Namely, it is desirable that the imaging lens SL according to the present embodiment satisfies the following conditional expression (6):

$$2.0<(-f3)/f<50.0 \tag{6}$$

where f3 is a focal length of the third lens group G3, and f is a focal length of the whole system upon focusing on an infinitely distant object.

Conditional expression (6) is an expression which specifies, as described above, a proper ratio of the power of the third lens group G3 to the focal length of the whole system. When the ratio (−f3)/f is equal to or exceeds the upper limit of conditional expression (6), since the refractive power of the third lens group G3 becomes weak, the quantity of lens extension of each lens group increases, and there is an increased variation in the total lens length, which is an undesirable point. Moreover, if the moving amount of each lens group is forcibly restrained, there worsen variations in the aberrations upon focusing on a close object that are especially curvature of field and astigmatism, which is an undesirable aspect. Here, it is preferable in order to ensure the effects of the present embodiment that the upper limit of conditional expression (6) is set to 40.0, thereby enabling the aberrations to be further well corrected. Further, it is more preferable for further ensuring the effects of the present embodiment that the upper limit of conditional expression (6) is set to 30.0. Still further, it is more preferable for further ensuring the effects of the present embodiment that the upper limit of conditional expression (6) is set to 20.0, thereby enabling the effects of the present embodiment to be exhibited at the maximum. On the other hand, when the ratio (−f3)/f is equal to or falls below the lower limit of conditional expression (6), refractive power of the third lens group G3 having negative refractive power is intensified, and hence the back focal length decreases, thereby disabling the lens barrel from being built up. Furthermore, an exit pupil gets close, and hence an eclipse, i.e., so-called shading of a micro lens array etc is caused on the image plane, which is an undesirable point. Here, it is preferable in order to ensure the effects of the present embodiment that the lower limit of conditional expression (6) is set to 5.0, thereby enabling the aberrations to be well corrected. Further, it is more preferable for further ensuring the effects of the present embodiment that the lower limit of conditional expression (6) is set to 6.0. Still further, it is more preferable for further ensuring the effects of the present embodiment that the lower limit of conditional expression (6) is set to 7.0, thereby enabling the effects of the present embodiment to be exhibited at the maximum.

Moreover, the imaging lens SL according to the present embodiment preferably satisfies the following conditional expression (7):

$$0.40<f2/f<1.50 \tag{7}$$

where f2 is the focal length of the second lens group G2, and f is the focal length of the whole system upon focusing on an infinitely distant object.

Conditional expression (7) is an expression which specifies the proper focal length, i.e., the proper refractive power of the second lens group G2 having positive refractive power. When the ratio f2/f is equal to or exceeds the upper limit of conditional expression (7), refractive power of the second lens group G2 having positive refractive power becomes weak, and therefore, if the second lens group G2 is a movable lens group, there increases the quantity of lens extension upon focusing for carrying out a close range photography, which is disadvantageous for driving an intra-lens-barrel motor and disables the configuration from being attained. Furthermore, if refractive power of another lens group is intensified for restraining the moving amount, there worsen variations in the aberrations that are especially curvature of field and astigmatism, which becomes an undesirable aspect. Here, it is preferable in order to ensure the effects of the present embodiment that the upper limit of conditional expression (7) is set to 1.20, thereby enabling the aberrations to be well corrected. Moreover, it is more preferable for further ensuring the effects of the present embodiment that the upper limit of conditional expression (7) is set to 1.00. Furthermore, it is more preferable for further ensuring the effects of the present embodiment that the upper limit of conditional expression (7) is set to 0.90, thereby enabling the effects of the present embodiment to be exhibited at the maximum. On the other hand, when the ratio f2/f is equal to or falls below the lower limit of conditional expression (7), refractive power of the second lens group G2 having positive refractive power gets intensified, so that there abruptly increase in aberration upon focusing, in particular, increase in spherical aberration, which is an undesirable point. Here, it is preferable in order to ensure the effects of the present embodiment that the lower limit of conditional expression (7) is set to 0.50, thereby enabling the aberrations to be well corrected. Further, it is more preferable for further ensuring the effects of the present embodiment that the lower limit of conditional expression (7) is set to 0.60. Still further, it is more preferable for further ensuring the effects of the present embodiment that the lower limit of conditional expression (7) is set to 0.70, thereby enabling the effects of the present embodiment to be exhibited at the maximum.

Moreover, it is desirable that the imaging lens SL according to the present embodiment satisfies the following conditional expression (8):

$$0.40 < |X1|/f < 1.50 \quad (8)$$

where f is the focal length of the whole system upon focusing on an infinitely distant object, and X1 is the moving amount of the first lens group G1, which comes to the maximum when focusing varies from an infinitely-distant-object-focusing state to a life-size-shooting-magnification (−1.0) state on condition that the moving amount takes a positive value in the case of moving to the object side from the image side.

Conditional expression (8) is an expression which specifies the moving amount of the first lens group G1 upon focusing from an infinitely distant object to a closest object, which is concerned with the maximum total lens length of the whole system, by use of the focal length. When the ratio |X1|/f is equal to or exceeds the upper limit of conditional expression (8), the optical system becomes long in its total lens length, heavy and time-consuming for extension of the lens. Otherwise, the shooting magnification is too small with respect to the variation in the total lens length to configure the macro lens. Furthermore, a distance between the second lens group G2 and the third lens group G3 becomes excessively large. Therefore, it is difficult to correct astigmatism, which is an undesirable point. Here, it is preferable for ensuring the effects of the present embodiment that the upper limit of conditional expression (8) is set to 1.20, thereby enabling the aberrations to be well corrected. Moreover, it is more preferable for further ensuring the effects of the present embodiment that the upper limit of conditional expression (8) is set to 1.00. Further, it is more preferable for further ensuring the effects of the present embodiment that the upper limit of conditional expression (8) is set to 0.90, thereby enabling the effects of the present embodiment to be exhibited at the maximum. On the other hand, when the ratio |X1|/f is equal to or falls below the lower limit of conditional expression (8), though the variation in the total lens length is small, the power of the each lens group is intensified by just that much, with the result that the amount of aberration increases. In particular, coma occurs as the shooting magnification increases, and this coma is hard to be corrected, which is an undesirable aspect. Here, it is preferable for ensuring the effects of the present embodiment that the lower limit of conditional expression (8) is set to 0.55, thereby enabling the aberrations to be well corrected. Further, it is more preferable for further ensuring the effects of the present embodiment that the lower limit of conditional expression (8) is set to 0.60. Still further, it is more preferable for further ensuring the effects of the present embodiment that the lower limit of conditional expression (8) is set to 0.65, thereby enabling the effects of the present embodiment to be exhibited at the maximum.

Incidentally, in the imaging lens SL according to the present embodiment, it is desirable that the first lens group G1 includes at least one negative lens and at least one positive lens and is composed of two through five lens elements on the whole. With this configuration, a sufficient angle of view can be ensured with a small number of lens elements, and it is possible to correct distortion and high-order coma. Moreover, in this case, it is desirable that a concave surface of at least one lens element of the negative lenses of the first lens group G1 is facing the image side, which enables the effects described above to be exhibited at the maximum.

It is desirable that in the imaging lens SL according to the present embodiment, the third lens group G3 is fixed upon focusing. This configuration schemes to simplify the mechanism of the lens barrel. Further, the third lens group G3 is fixed, and hence, upon focusing on the closest object from an infinitely distant object, there varies a height at which the light beam emerging from the third lens group G3 travels, whereby the coma can be restrained over the positions from the infinitely distant object point to the closest object point and satisfactory performance can be ensured.

An aperture stop S is, it is preferable, disposed within the second lens group G2, however, an available configuration is that a lens frame substitutes for a role of the aperture stop without providing a member as the aperture stop.

Figure 15:
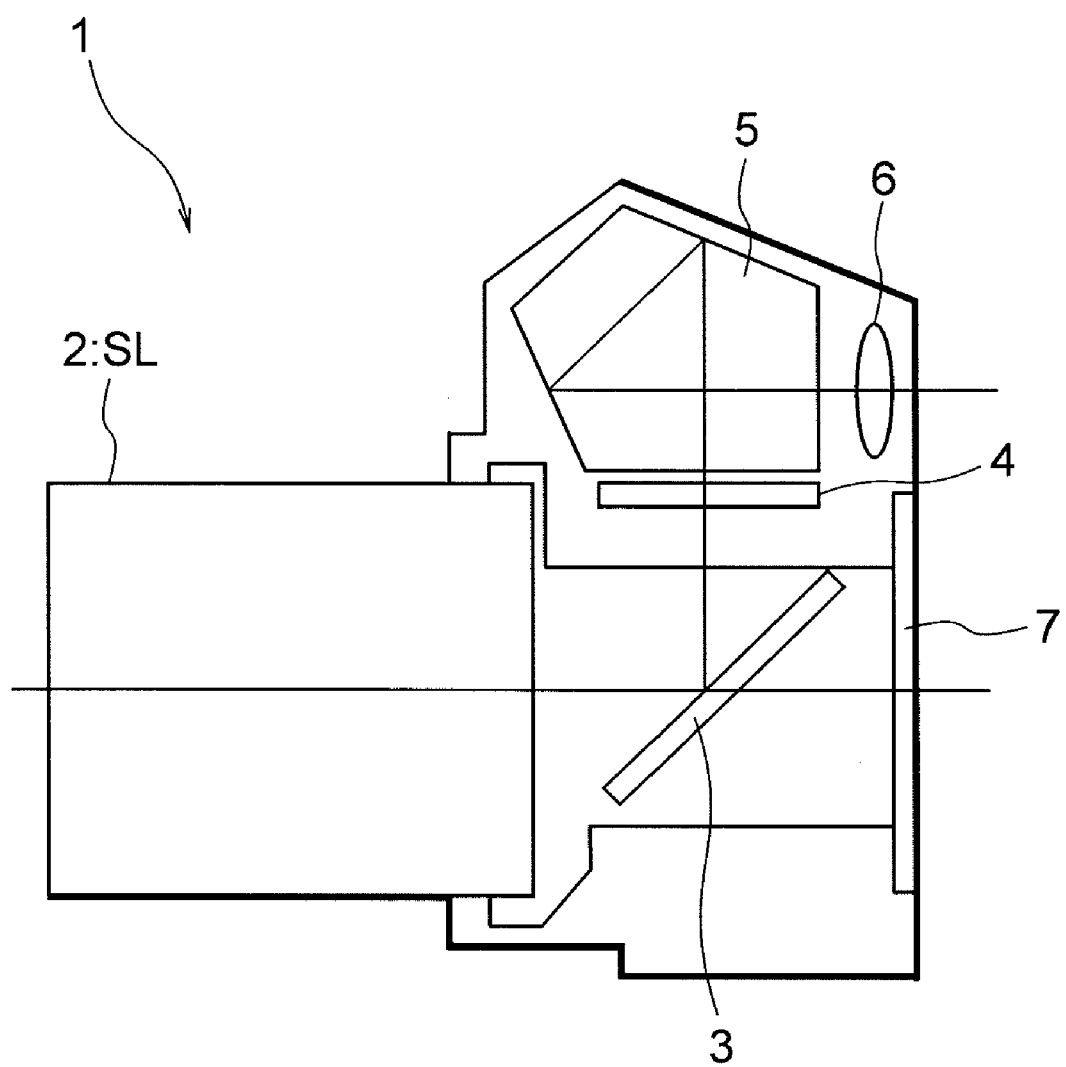
FIG. 15 is a sectional view of a digital single lens reflex camera mounted with the imaging lens according to the present embodiment.

FIG. 15 shows a schematic sectional view of a single lens reflex digital camera 1 (which will hereinafter simply be termed a camera) by way of an optical apparatus including the imaging lens SL described above. In the camera 1, the light beams from an unillustrated object (an object to be imaged) are converged by an imaging lens 2 (the imaging lens SL), and an image of the light beams is formed on a focusing screen 4 via a quick return mirror 3. Then, the light beams, of which the image is formed on the focusing screen 4, are reflected plural times within a pentagonal roof prism 5 and led to an eyepiece 6. A photographer is thereby capable of observing the object (the object to be imaged) as an erected image via the eyepiece 6.

Moreover, when the photographer presses an unillustrated release button, the quick return mirror 3 retreats outside a light path, and the light beams from the unillustrated object (the object to be imaged), which are converged by the imaging lens 2, form an object image on an imaging device 7. The image of the light beams from the object (the object to be imaged) is thereby formed by the imaging device 7 and recorded as the image of the object (the object to be imaged)

in an unillustrated memory. Thus, the photographer can photograph the object (the object to be imaged) by use of the present camera 1. Note that the camera 1 illustrated in FIG. 15 may be constructed to retain the imaging lens SL in an attachable/detachable manner and may also be constructed integrally with the imaging lens SL. Moreover, the camera 1 may be constructed as a so-called single lens reflex camera and may also be constructed as a compact camera including none of the quick return mirror etc.

Figure 16:
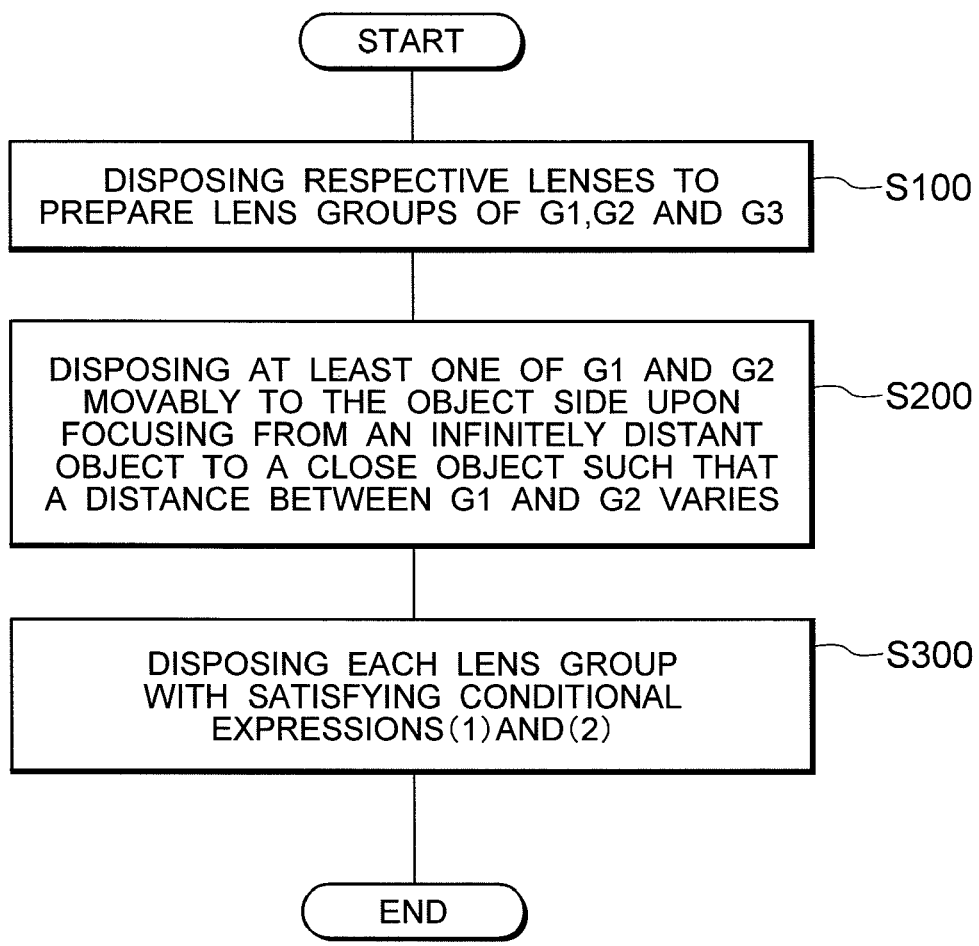
FIG. 16 is an explanatory flowchart of a method for manufacturing an imaging lens according to the present embodiment.

An outline of a method for manufacturing an imaging lens SL according to the present embodiment will hereinafter be described with reference to FIG. 16. To start with, the lens groups are prepared by disposing respective lenses (step S100). To be specific, in the present embodiment, e.g., a first lens group G1 is composed of disposing, in order from the object side, a positive meniscus lens L11 with a convex surface facing the object side and a negative meniscus lens L12 with a convex surface facing the object side; the second lens group G2 is composed of disposing, in order from the object side, a cemented lens constructed by a double convex lens L21 cemented with a double concave lens L22, an aperture stop S, a double concave lens L23, a positive meniscus lens L24 with a convex surface facing the image side, and a double convex lens L25; and the third lens group G3 is composed of disposing, in order from the object side, a double concave lens L31 and a double convex lens L32. The imaging lens SL is manufactured by disposing the thus-prepared lens groups.

At this time, at least one of the first lens group G1 and the second lens group G2 is disposed movably to the object side upon focusing from an infinitely distant object to a close object such that a distance between the first lens group G1 and the second lens group G2 varies (step S200).

Furthermore, each lens groups is disposed to satisfy conditional expressions (1) and (2) described above, where β is the shooting magnification upon focusing on the closest object, X1 is the moving amount of the first lens group G1, which comes to the maximum when focusing varies from an infinitely-distant-object-focusing state to a life-size-shooting-magnification state, and f2 is the focal length of the second lens group G2 (step S300).

EXAMPLES

Each of Examples according to the present application will hereinafter be described with reference to accompanying drawings. Note that FIGS. 1, 3, 5, 7, 9, 11 and 13 illustrate how refractive power of imaging lenses SL1-SL7 is distributed and how the respective lens groups are moved upon focusing on a close object from an infinitely distant object, in which the upper portion shows an infinitely-distant-object-focusing state, the middle portion shows a quasi-life-size-shooting-magnification (−0.5) state, and the lower portion shows a life-size-shooting-magnification (−1.0) state. As illustrated in these drawings, each of the imaging lenses SL1-SL7 in each Example is composed of, in order from the object side, a first lens group G1 having negative refractive power, a second lens group G2 having positive refractive power and a third lens group G3 having negative refractive power.

In each of Examples, a low-pass filter P1 for cutting a spatial frequency equal to or larger than a resolution limit of a solid-state imaging device such as a CCD (Charge Coupled Device) disposed on an image plane I, is provided between the third lens group G3 and the image plane I.

Moreover, Examples 3 and 4 include an aspherical lens. The aspherical surface is expressed by the following expression (a):

$$S(y)=(y^2/r)/(1+(1-k\times y^2/r^2)^{1/2})+A4\times y^4+A6\times y^6+A8\times y^8+A10\times y^{10}$$ (a)

where y is a height in the direction vertical to the optical axis, S(y) is a distance (sag amount) along the optical axis from a tangent plane of a vertex of each aspherical surface at the height y up to each aspherical surface, r is a radius of curvature (paraxial radius of curvature) of the reference sphere, k is a conical coefficient and An is an n-th order aspherical surface coefficient. For example, [E−n] represents [×10$^{-n}$]. It should be noted that a secondary aspherical surface coefficient A2 is "0" in Examples 3 and 4. Furthermore, the aspherical surface is attached with a mark "*" on the left side of a surface number in (Lens Surface Data) in Examples 3 and 4.

Example 1

FIG. 1 is a view showing a configuration of an imaging lens SL1 according to Example 1. In the imaging lens SL1 in FIG. 1, a first lens group G1 is composed of, in order from an object side, two lens elements, i.e., a positive meniscus lens L11 with a convex surface facing the object side and a negative meniscus lens L12 with a convex surface facing the object side. A second lens group G2 having positive refractive power on the whole is composed of, in order from the object side, five lens elements such as a cemented lens constructed by a double convex lens L21 cemented with a double concave lens L22, an aperture stop S, a double concave lens L23, a positive meniscus lens L24 with a convex surface facing an image side and a double convex lens L25. A third lens group G3 having negative refractive power on the whole is composed of, in order from the object side, a double concave lens L31 and a double convex lens L32.

The following table 1 shows various items of data of the imaging lens SL1 according to Example 1. In Table 1, "f" is a focal length, "FNO" is an f-number, "2ω" is an angle of view, and "Bf" represents a back focal length, respectively. Further, the left most column "i" shows an order of the lens surface from the object side along a direction in which the light beams travel, the second column "r" shows a radius of curvature of each optical surface, the third column "d" indicates a distance along the optical axis from each optical surface to the next optical surface, the fourth column "vd" and the fifth column "nd" represent values of an Abbe number and a refractive index with respect to d-line (λ=587.6 nm), respectively. In (Lens Group Data), a start surface number "ST" and a focal length of each lens group are shown. In (Variable Distances), variable distances, a back focal length "Bf", and a total lens length "TL" with respect to shooting magnifications of 0, −0.5 and −0.1 are shown. Here, the focal length, the radius of curvature, the surface distance and other items of data described in the following various items of whole data involve using generally [mm] as the unit of the length, however, the optical system acquires the similar optical performance even when proportionally enlarged or reduced and is not therefore limited to this unit. Incidentally, the radius of curvature "r=0.0000" indicates a plane surface, and the refractive index "nd=1.00000" of the air is omitted. Further, the descriptions of the reference numerals and symbols and the various items of data are the same in the subsequent Examples.

TABLE 1

(Specifications)

| | |
|---|---|
| f = | 40.00 |
| Bf = | 38.499 (constant) |
| FNO = | 2.82 |
| 2ω = | 40.7° |

(Lens Surface Data)

| i | r | d | vd | nd |
|---|---|---|---|---|
| 1 | 26.1179 | 3.35 | 25.42 | 1.80518 |
| 2 | 38.5567 | 0.30 | | |
| 3 | 28.3090 | 1.85 | 44.79 | 1.74400 |
| 4 | 12.4140 | (d1) | | |
| 5 | 36.7256 | 6.10 | 49.60 | 1.77250 |
| 6 | −15.6437 | 1.50 | 45.78 | 1.54814 |
| 7 | 214.8756 | 3.00 | | |
| 8 | 0.0000 | 3.00 | Aperture Stop S | |
| 9 | −21.4651 | 1.40 | 27.79 | 1.74077 |
| 10 | 62.7506 | 1.70 | | |
| 11 | −68.6301 | 3.30 | 58.55 | 1.65160 |
| 12 | −21.4842 | 0.24 | | |
| 13 | 102.3954 | 3.90 | 52.64 | 1.74100 |
| 14 | −32.9686 | (d2) | | |
| 15 | −203.3365 | 1.60 | 49.60 | 1.77250 |
| 16 | 25.9553 | 0.80 | | |
| 17 | 27.2693 | 4.70 | 45.78 | 1.54814 |
| 18 | −59.2410 | (Bf) | | |

(Lens Group Data)

| Group | ST | Focal Length |
|---|---|---|
| G1 | 1 | −54.96113 |
| G2 | 5 | 28.93392 |
| G3 | 15 | −327.30654 |

(Variable Distances)

| β = | 0 | −0.5 | −1.0 |
|---|---|---|---|
| d1 = | 12.4231 | 12.1244 | 12.0004 |
| d2 = | 2.1725 | 16.5637 | 30.9649 |
| Bf = | 38.499 | 38.499 | 38.499 |
| TL = | 89.8320 | 103.9245 | 118.2018 |

(Values for Conditional Expressions)

(1) (−β) = 1.000
(2) |X1|/f2 = 0.981
(3) f2/(−f1) = 0.526
(4) f/TL = 0.445
(5) (−f1)/f = 1.374
(6) (−f3)/f = 8.183
(7) f2/f = 0.723
(8) |−X1|/f = 0.709

Figure 2B:
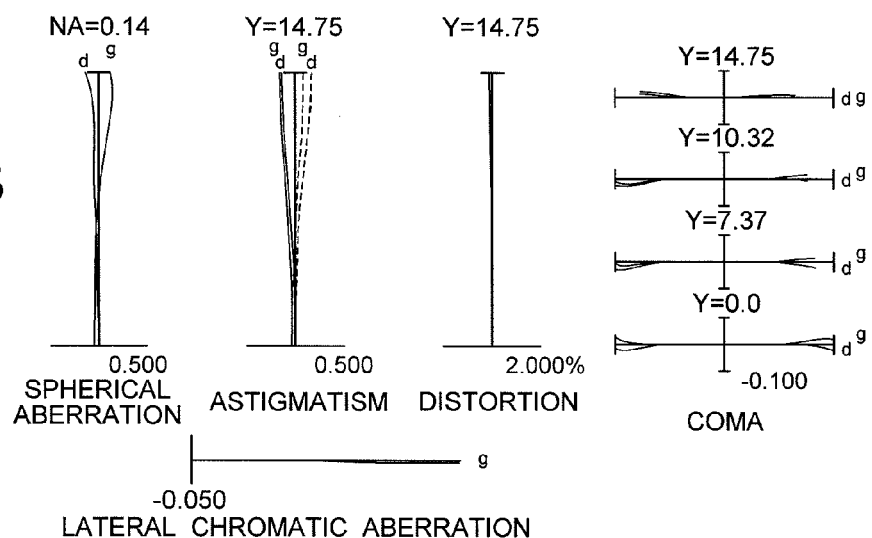
Figure 2C:
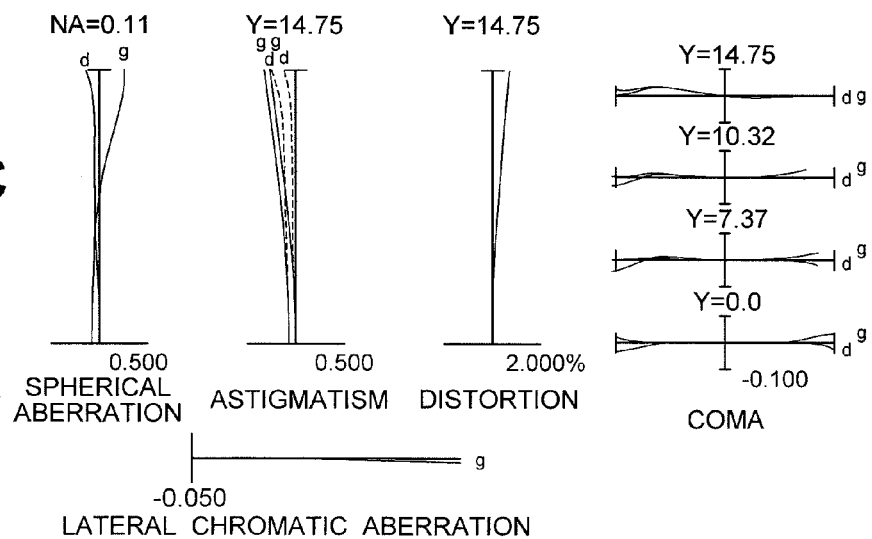

FIGS. 2A, 2B and 2C are diagrams of various aberrations in Example 1, in which FIG. 2A is the diagram of the various aberrations in an infinite-distance focusing state, FIG. 2B is a diagram of the various aberrations in a quasi-life-size-shooting-magnification (−0.5) state, and FIG. 2C is a diagram of the various aberrations in a life-size-shooting-magnification (−1.0) state.

In respective graphs, FNO denotes an f-number, and Y denotes an image height. "d" denotes aberration curve at d-line (587.6 nm), and "g" denotes aberration curve at g-line (435.8 nm). In graphs showing spherical aberration, the f-number with respect to the maximum aperture is shown. In graphs showing astigmatism and distortion, the maximum value of the image height "Y" is shown. In graphs showing coma, each value of each image height is shown. In graphs showing astigmatism, a solid line indicates a sagittal image plane, and a broken line indicates a meridional image plane. The explanations of reference symbols are the same in the other Examples.

As is apparent from various graphs, the optical system according to Example 1 of the present application shows superb optical performance as a result of good corrections to various aberrations over entire focusing range from an infinitely-distant-object-focusing state to a close-object-focusing state.

Example 2

FIG. 3 is a view showing a configuration of an imaging lens SL2 according to Example 2. In the imaging lens SL2 in FIG. 3, the first lens group G1 having negative refractive power on the whole is composed of, in order from the object side, two lens elements, i.e., a double concave lens L11 and a double convex lens L12. The second lens group G2 having positive refractive power on the whole is composed of, in order from the object side, five lens elements such as a cemented lens constructed by a double convex lens L21 cemented with a negative meniscus lens L22 with a concave surface facing the object side, an aperture stop S, a double concave lens L23, a positive meniscus lens L24 with a convex surface facing the image side and a double convex lens L25. The third lens group G3 having negative refractive power on the whole is composed of, in order from the object side, two lens elements such as a negative meniscus lens L31 with a concave surface facing the image side and a positive meniscus lens L32 with a convex surface facing the image side.

The following Table 2 shows values of various items of data in Example 2.

TABLE 2

(Specifications)

| | |
|---|---|
| f = | 40.00 |
| Bf = | 40.137 (constant) |
| FNO = | 3.79 |
| 2ω = | 41.10° |

(Lens Surface Data)

| i | r | d | vd | nd |
|---|---|---|---|---|
| 1 | −106.8278 | 1.85 | 44.79 | 1.74400 |
| 2 | 25.6391 | 1.00 | | |
| 3 | 95.5375 | 2.60 | 25.68 | 1.78472 |
| 4 | −127.7017 | (d1) | | |
| 5 | 48.2706 | 6.10 | 49.60 | 1.77250 |
| 6 | −21.3213 | 1.50 | 45.78 | 1.54814 |
| 7 | −73.4809 | 2.50 | | |
| 8 | 0.0000 | 7.96 | Aperture Stop S | |
| 9 | −12.2937 | 1.40 | 27.79 | 1.74077 |
| 10 | 6776.3938 | 1.40 | | |
| 11 | −33.3157 | 3.00 | 58.55 | 1.65160 |
| 12 | −14.8650 | 0.24 | | |
| 13 | 158762.6337 | 3.50 | 52.64 | 1.74100 |
| 14 | −21.9061 | (d2) | | |
| 15 | 73.6737 | 1.60 | 50.24 | 1.71999 |
| 16 | 36.6378 | 3.20 | | |
| 17 | −95.7156 | 3.00 | 38.02 | 1.60342 |
| 18 | −46.6605 | (Bf) | | |

(Lens Group Data)

| Group | ST | Focal Length |
|---|---|---|
| G1 | 1 | −47.69852 |
| G2 | 5 | 30.63683 |
| G3 | 15 | −394.27034 |

(Variable Distances)

| β = | 0 | −0.5 | −1.0 |
|---|---|---|---|
| d1 = | 0.9999 | 3.2879 | 5.3436 |

TABLE 2-continued

| d2 = | 1.0000 | 14.1000 | 26.1530 |
| Bf = | 40.137 | 40.137 | 40.137 |
| TL = | 82.9883 | 98.3763 | 112.4850 |

(Values for Conditional Expressions)

Figure 4A:
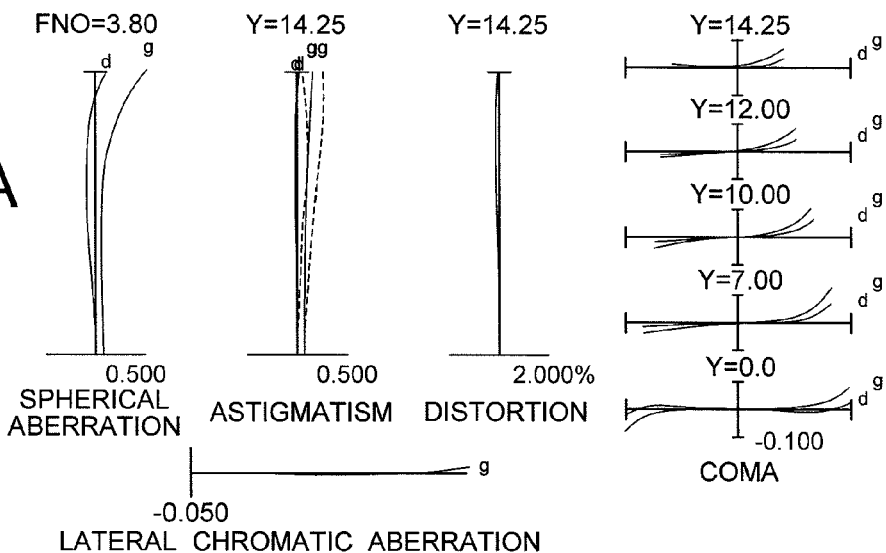
Figure 4B:
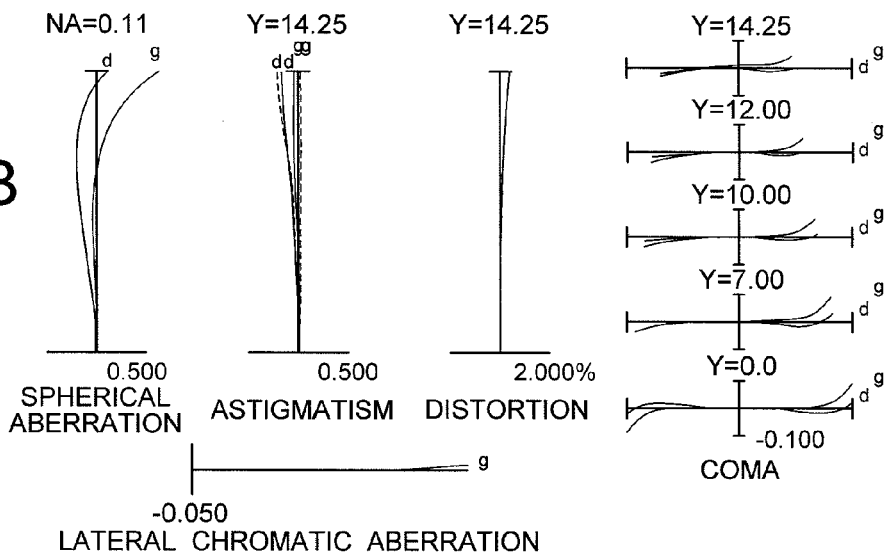
Figure 4C:
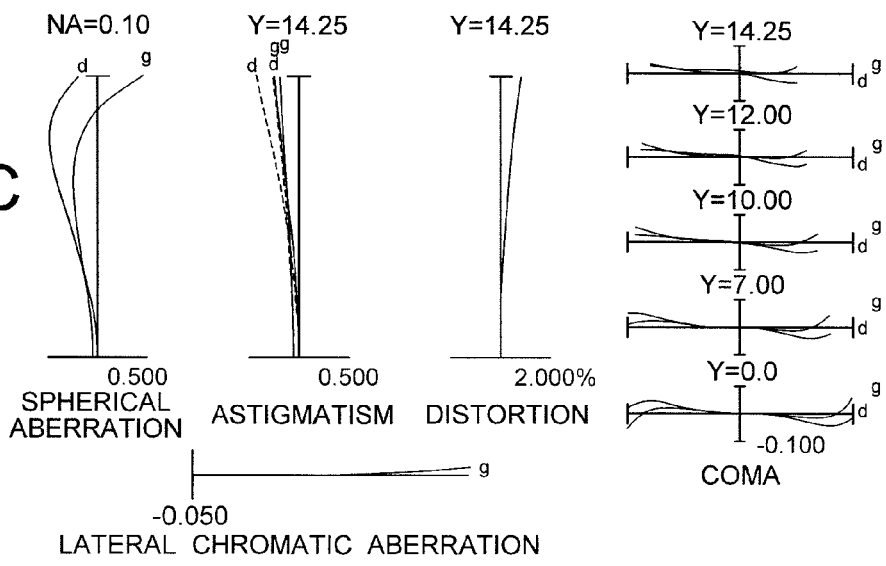

(1) $(-\beta) = 1.000$
(2) $|X1|/f2 = 0.963$
(3) $f2/(-f1) = 0.642$
(4) $f/TL = 0.356$
(5) $(-f1)/f = 1.192$
(6) $(-f3)/f = 9.857$
(7) $f2/f = 0.766$
(8) $|-X1|/f = 0.737$ FIGS. 4A, 4B and 4C are diagrams of various aberrations in Example 2, in which FIG. 4A is the diagram of the various aberrations in an infinite-distance focusing state, FIG. 4B is a diagram of the various aberrations in a quasi-life-size-shooting-magnification (−0.5) state, and FIG. 4C is a diagram of the various aberrations in a life-size-shooting-magnification (−1.0) state.

As is apparent from various graphs, the optical system according to Example 2 of the present application shows superb optical performance as a result of good corrections to various aberrations over entire focusing range from an infinitely-distant-object-focusing state to a close-object-focusing state.

Example 3

FIG. 5 is a view showing a configuration of an imaging lens SL3 according to Example 3. In the imaging lens SL3 in FIG. 5, the first lens group G1 having negative refractive power on the whole is composed of, in order from the object side, two lens elements, i.e., a double concave lens L11 and a double convex lens L12. The second lens group G2 having positive refractive power on the whole is composed of, in order from the object side, four lens elements such as a double convex lens L21, a negative meniscus lens L22 with a concave surface facing the image side, an aperture stop S and a cemented lens constructed by a double concave lens L23 cemented with a double convex lens L24. The third lens group G3 having negative refractive power on the whole is composed of, in order from the object side, two lens elements such as a negative meniscus lens L31 with a concave surface facing the image side and a double convex lens L32.

The following Table 3 shows values of various items of data in Example 3.

TABLE 3

(Specifications)

| f = | 40.00 |
| Bf = | 39.554 (constant) |
| FNO = | 3.38 |
| 2ω = | 41.80° |

(Lens Surface Data)

| i | r | d | νd | nd |
|---|---|---|----|----|
| 1 | −68.2689 | 2.00 | 61.15 | 1.58887 |
| *2 | 19.3667 | 6.70 | | |
| 3 | 38.4885 | 4.00 | 56.17 | 1.65100 |
| 4 | −400.0451 | (d1) | | |
| 5 | 17.9793 | 4.00 | 47.93 | 1.71700 |
| *6 | −21837.6180 | 0.23 | | |
| 7 | 23.0087 | 2.00 | 30.13 | 1.69895 |
| 8 | 13.1885 | 5.16 | | |
| 9 | 0.0000 | 1.50 | Aperture Stop S | |
| 10 | −66.4939 | 0.80 | 32.11 | 1.67270 |
| 11 | 26.1840 | 4.28 | 64.10 | 1.51680 |
| 12 | −19.6382 | (d2) | | |
| 13 | 556.8819 | 1.70 | 59.45 | 1.53996 |
| 14 | 36.3003 | 0.80 | | |
| 15 | 82.2410 | 3.00 | 40.11 | 1.76200 |
| 16 | −250.0000 | (Bf) | | |

(Lens Group Data)

| Group | ST | Focal Length |
|-------|----|----|
| G1 | 1 | −63.85136 |
| G2 | 5 | 34.00249 |
| G3 | 13 | −700.00005 |

(Aspherical Surface Data)

Surface Number: 2

κ = 1.5509
A4 = −2.15100E−05
A6 = −1.50980E−07
A8 = 7.77600E−10
A10 = −5.81330E−12

Surface Number: 6

κ = 1.0000
A4 = 2.89880E−05
A6 = 1.65020E−08
A8 = −4.09580E−10
A10 = 1.76840E−12

(Variable Distances)

| β = | 0 | −0.5 | −1.0 |
| d1 = | 4.5657 | 6.3762 | 5.1420 |
| d2 = | 1.0000 | 17.2114 | 35.1276 |
| Bf = | 39.554 | 39.554 | 39.554 |
| TL = | 81.2877 | 99.3096 | 115.9916 |

(Values for Conditional Expressions)

Figure 6A:
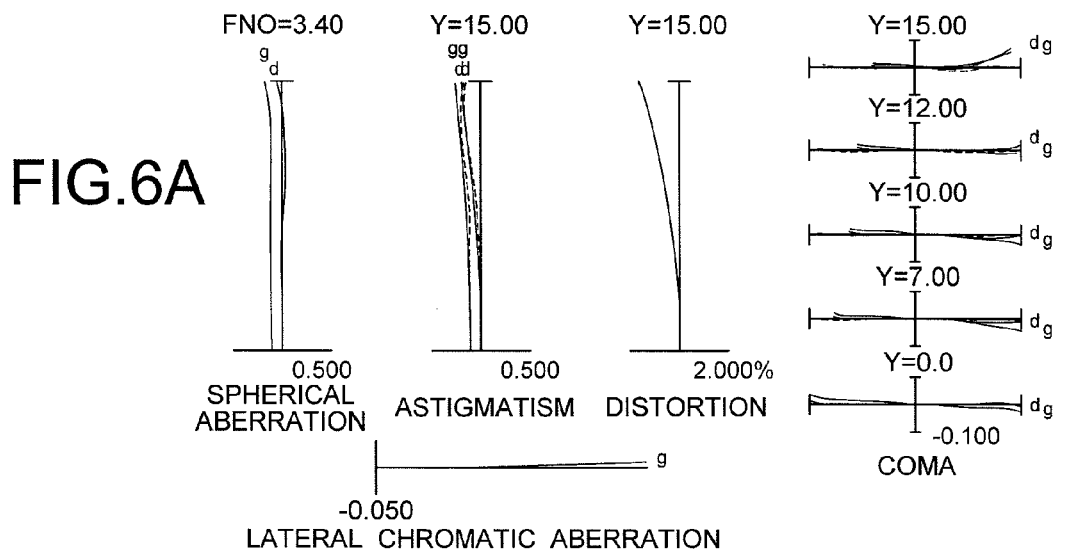
Figure 6B:
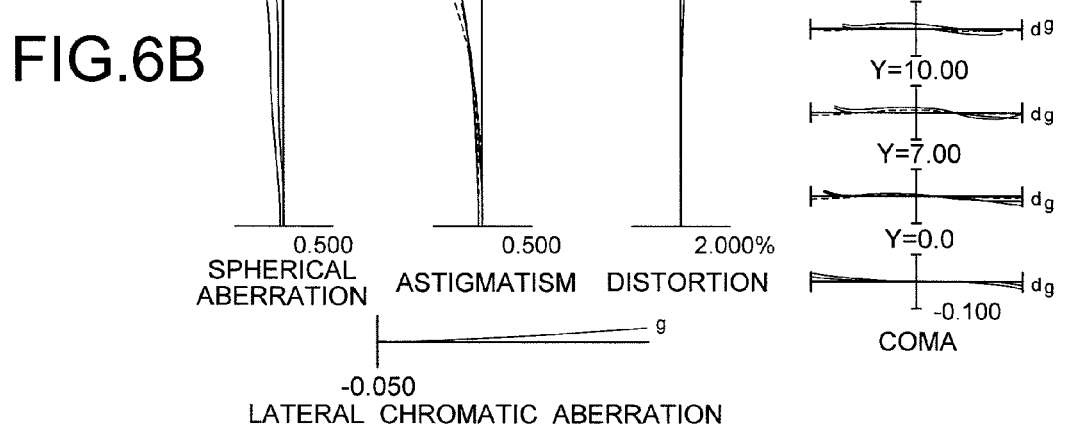
Figure 6C:
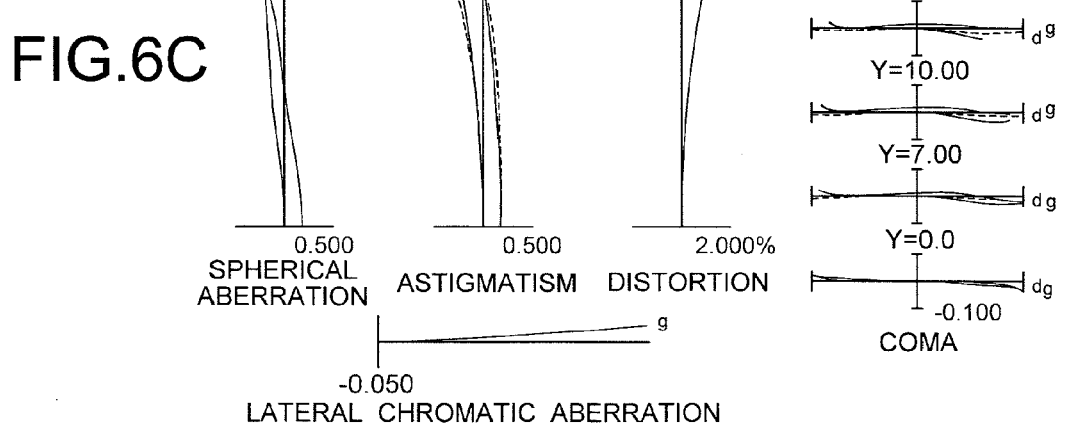

(1) $(-\beta) = 1.000$
(2) $|X1|/f2 = 1.021$
(3) $f2/(-f1) = 0.533$
(4) $f/TL = 0.492$
(5) $(-f1)/f = 1.596$
(6) $(-f3)/f = 17.500$
(7) $f2/f = 0.850$
(8) $|-X1|/f = 0.868$ FIGS. 6A, 6B and 6C are diagrams of various aberrations in Example 3, in which FIG. 6A is the diagram of the various aberrations in an infinite-distance focusing state, FIG. 6B is a diagram of the various aberrations in a quasi-life-size-shooting-magnification (−0.5) state, and FIG. 6C is a diagram of the various aberrations in a life-size shooting magnification (−1.0) state.

As is apparent from various graphs, the optical system according to Example 3 of the present application shows superb optical performance as a result of good corrections to various aberrations over entire focusing range from an infinitely-distant-object-focusing state to a close-object-focusing state.

Example 4

FIG. 7 is a view showing a configuration of an imaging lens SL4 according to Example 4. In the imaging lens SL4 in FIG. 7, the first lens group G1 having negative refractive power on the whole is composed of, in order from the object side, two lens elements, i.e., a double concave lens L11 and a double convex lens L12. The second lens group G2 having positive refractive power on the whole is composed of, in order from the object side, four lens elements such as a double convex lens L21, a cemented lens constructed by a positive meniscus lens L22 with a concave surface facing the image side cemented with a double concave lens L23, an aperture stop S and a double convex lens L24. The third lens group G3 having negative refractive power on the whole is composed of, in order from the object side, two lens elements such as a double concave lens L31 and a double convex lens L32.

The following Table 4 shows values of various items of data in Example 4.

TABLE 4

| (Specifications) | |
|---|---|
| f = | 40.00 |
| Bf = | 39.579 (constant) |
| FNO = | 3.24 |
| 2ω = | 41.50° |

| (Lens Surface Data) | | | | |
|---|---|---|---|---|
| i | r | d | vd | nd |
| 1 | −63.9517 | 0.90 | 59.73 | 1.52249 |
| *2 | 17.5347 | 3.31 | | |
| 3 | 160.2107 | 2.73 | 44.78 | 1.74400 |
| 4 | −42.2120 | (d1) | | |
| 5 | 35.4070 | 5.00 | 44.78 | 1.74400 |
| 6 | −39.1498 | 4.18 | | |
| 7 | −210.2646 | 2.25 | 70.41 | 1.48749 |
| 8 | −20.8349 | 0.90 | 27.78 | 1.74077 |
| 9 | 26.6445 | 3.60 | | |
| 10 | 0.0000 | 1.65 | Aperture Stop S | |
| 11 | 438.8641 | 3.71 | 44.78 | 1.74400 |
| 12 | −26.0822 | (d2) | | |
| 13 | −107.1341 | 0.90 | 58.93 | 1.51823 |
| 14 | 38.3363 | 0.74 | | |
| 15 | 108.9497 | 2.86 | 44.78 | 1.74400 |
| 16 | −83.7148 | (Bf) | | |

| (Lens Group Data) | | |
|---|---|---|
| Group | ST | Focal Length |
| G1 | 1 | −83.19307 |
| G2 | 5 | 35.65762 |
| G3 | 13 | −444.23813 |

(Aspherical Surface Data)
Surface Number: 2

κ = 1.4363
A4 = −1.41670E−05
A6 = −7.24370E−08
A8 = −2.79860E−10
A10 = −1.59670E−12

| (Variable Distances) | | | |
|---|---|---|---|
| β = | 0 | −0.5 | −1.0 |
| d1 = | 11.9639 | 11.6564 | 11.4549 |
| d2 = | 1.2000 | 17.1344 | 33.1268 |
| Bf = | 39.579 | 39.579 | 39.579 |
| TL = | 85.4712 | 101.0981 | 116.8890 |

(Values for Conditional Expressions)

(1) (−β) = 1.000
(2) |X1|/f2 = 0.881
(3) f2/(−f1) = 0.429
(4) f/TL = 0.468
(5) (−f1)/f = 2.080
(6) (−f3)/f = 11.106
(7) f2/f = 0.891
(8) |−X1|/f = 0.785

Figure 8A:
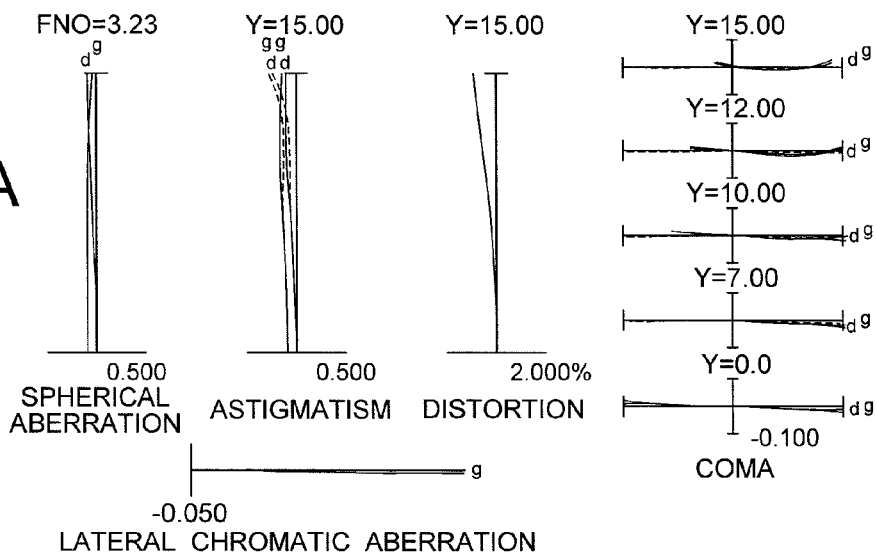
Figure 8B:
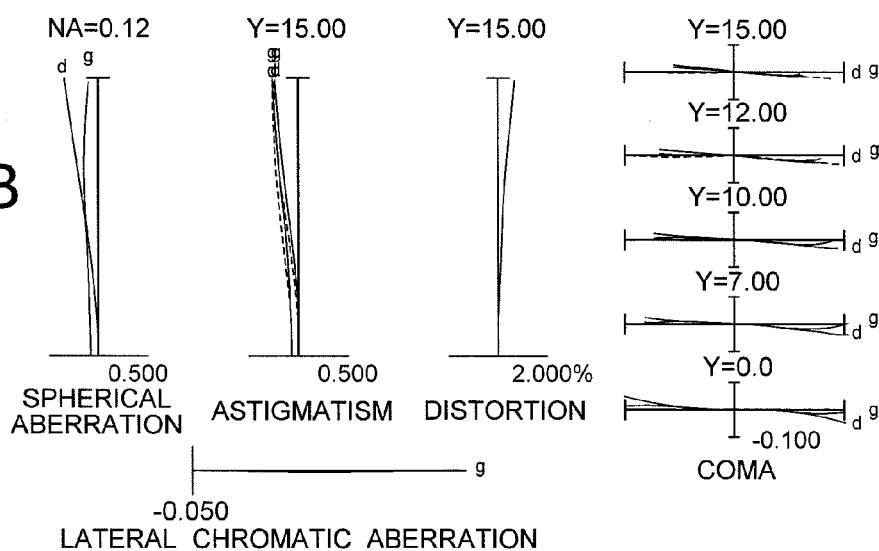
Figure 8C:
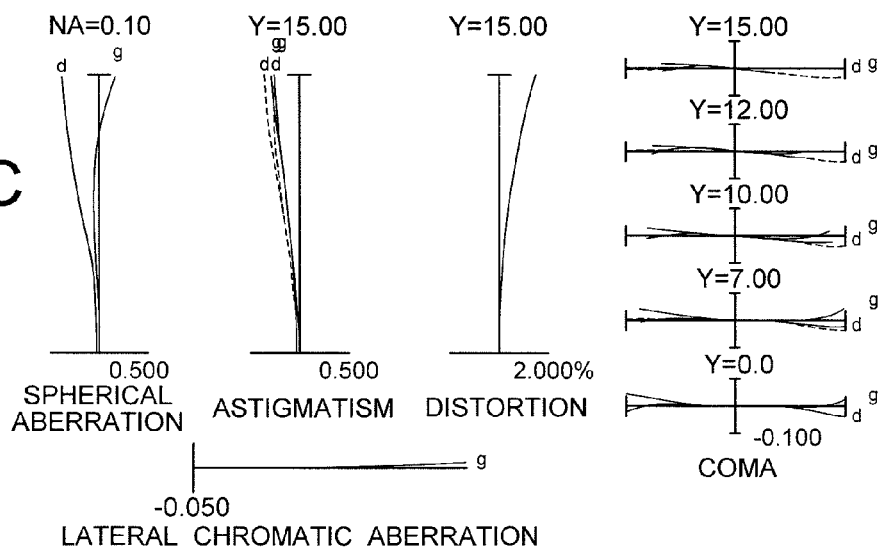

FIGS. 8A, 8B and 8C are diagrams of various aberrations in Example 4, in which FIG. 8A is the diagram of the various aberrations in an infinite-distance focusing state, FIG. 8B is a diagram of the various aberrations in a quasi-life-size-shooting-magnification (−0.5) state, and FIG. 8C is a diagram of the various aberrations in a life-size shooting magnification (−1.0) state.

As is apparent from various graphs, the optical system according to Example 4 of the present application shows superb optical performance as a result of good corrections to various aberrations over entire focusing range from an infinitely-distant-object-focusing state to a close-object-focusing state.

Example 5

FIG. 9 is a view showing a configuration of an imaging lens SL5 according to Example 5. In the imaging lens SL5 in FIG. 9, the first lens group G1 having negative refractive power on the whole is composed of, in order from the object side, five lens elements, i.e., a negative meniscus lens L11 with a convex surface facing the object side, a negative meniscus lens L12 with a convex surface facing the object side, a double convex lens L13, a double convex lens L14 and a double concave lens L15. The second lens group G2 having positive refractive power on the whole is composed of, in order from the object side, three lens elements such as an aperture stop S, a cemented lens constructed by a double concave lens L21 cemented with a double convex lens L22, and a double convex lens L23. The third lens group G3 having negative refractive power on the whole is composed of, in order from the object side, two lens elements such as a double concave lens L31 and a positive meniscus lens L32 with a concave surface facing the object side.

The following Table 5 shows values of various items of data in Example 5.

TABLE 5

| (Specifications) | |
|---|---|
| f = | 39.14 |
| Bf = | 41.090 (constant) |
| FNO = | 3.76 |
| 2ω = | 39.79° |

| (Lens Surface Data) | | | | |
|---|---|---|---|---|
| i | r | d | vd | nd |
| 1 | 54.2302 | 2.00 | 70.40 | 1.48749 |
| 2 | 17.3305 | 2.64 | | |
| 3 | 49.6086 | 1.00 | 70.45 | 1.48749 |
| 4 | 14.4559 | 2.12 | | |
| 5 | 31.2482 | 3.00 | 40.11 | 1.76200 |
| 6 | −79.9498 | 6.16 | | |
| 7 | 27.4214 | 4.00 | 58.73 | 1.61272 |
| 8 | −23.9284 | 0.10 | | |
| 9 | −65.2739 | 2.00 | 37.00 | 1.61293 |
| 10 | 14.0969 | (d1) | | |
| 11 | 0.0000 | 4.00 | Aperture Stop S | |
| 12 | −48.3211 | 1.20 | 35.70 | 1.62588 |
| 13 | 39.1123 | 4.00 | 63.38 | 1.61800 |
| 14 | −19.8696 | 0.10 | | |
| 15 | 71.4649 | 3.45 | 63.73 | 1.61881 |
| 16 | −484.0506 | (d2) | | |
| 17 | −212.3723 | 1.20 | 45.79 | 1.54814 |
| 18 | 38.9548 | 1.55 | | |
| 19 | −304.0438 | 2.55 | 44.79 | 1.74400 |
| 20 | −46.2980 | (Bf) | | |

TABLE 5-continued (Lens Group Data)

| Group | ST | Focal Length |
|---|---|---|
| G1 | 1 | −143.60502 |
| G2 | 11 | 33.88088 |
| G3 | 17 | −449.00551 |

(Variable Distances)

| β = | 0 | −0.5 | −1.0 |
|---|---|---|---|
| d1 = | 12.0835 | 12.3858 | 13.6139 |
| d2 = | 3.7111 | 18.5251 | 33.0350 |
| Bf = | 41.090 | 41.090 | 41.090 |
| TL = | 97.9491 | 113.0653 | 128.8033 |

(Values for Conditional Expressions)

(1) (−β) = 1.000
(2) |X1|/f2 = 0.911
(3) f2/(−f1) = 0.236
(4) f/TL = 0.400
(5) (−f1)/f = 3.669
(6) (−f3)/f = 11.473
(7) f2/f = 0.866
(8) |−X1|/f = 0.788

Figure 10A:
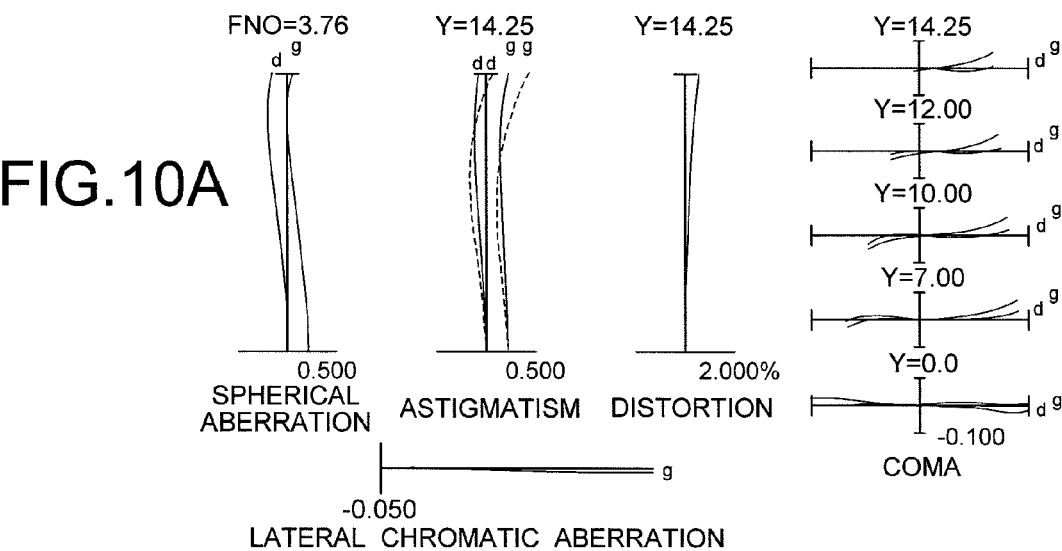
Figure 10B:
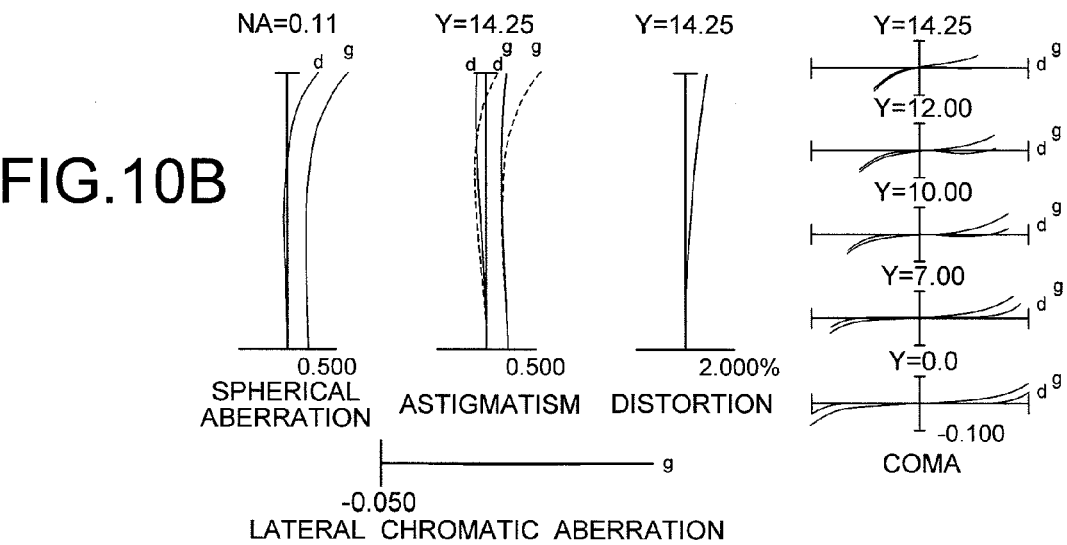
Figure 10C:
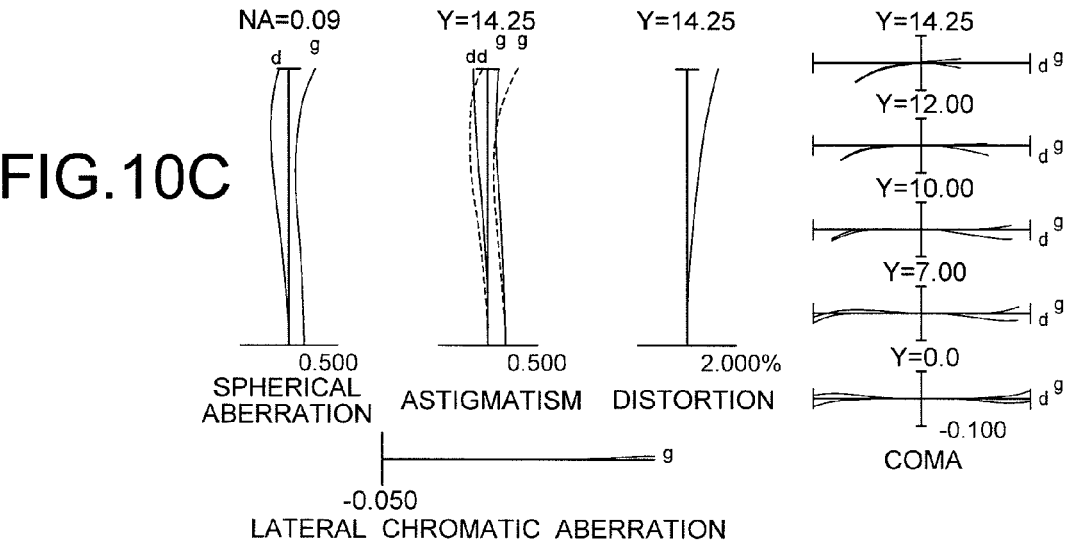

FIGS. 10A, 10B and 10C are diagrams of various aberrations in Example 5, in which FIG. 10A is the diagram of the various aberrations in an infinite-distance focusing state, FIG. 10B is a diagram of the various aberrations in a quasi-life-size-shooting-magnification (−0.5) state, and FIG. 10C is a diagram of the various aberrations in a life-size shooting magnification (−1.0) state.

As is apparent from various graphs, the optical system according to Example 5 of the present application shows superb optical performance as a result of good corrections to various aberrations over entire focusing range from an infinitely-distant-object-focusing state to a close-object-focusing state.

Example 6

FIG. 11 is a view showing a configuration of an imaging lens SL6 according to Example 6. In the imaging lens SL6 in FIG. 11, the first lens group G1 having negative refractive power on the whole is composed of, in order from the object side, two lens elements, i.e., a cemented lens constructed by a negative meniscus lens L11 with a convex surface facing the object side cemented with a positive meniscus lens L12 with a convex surface facing the object side. The second lens group G2 having positive refractive power on the whole is composed of, in order from the object side, five lens elements such as a cemented lens constructed by a double convex lens L21 cemented with a double concave lens L22, an aperture stop S, a double concave lens L23, a positive meniscus lens L24 with a convex surface facing the image side and a double convex lens L25. The third lens group G3 having negative refractive power on the whole is composed of, in order from the object side, two lens elements such as a double concave lens L31 and a double convex lens L32.

The following Table 6 shows values of various items of data in Example 6.

TABLE 6

(Specifications)

| f = | 40.00 |
|---|---|
| Bf = | 39.820 (constant) |

TABLE 6-continued

| FNO = | 2.86 |
|---|---|
| 2ω = | 41.24° |

(Lens Surface Data)

| i | r | d | νd | nd |
|---|---|---|---|---|
| 1 | 26.4826 | 1.85 | 44.79 | 1.74400 |
| 2 | 13.5172 | 3.35 | 25.68 | 1.78472 |
| 3 | 13.7673 | (d1) | | |
| 4 | 37.3029 | 6.10 | 49.60 | 1.77250 |
| 5 | −17.7447 | 1.50 | 45.78 | 1.54814 |
| 6 | 2349.4438 | 2.50 | | |
| 7 | 0.0000 | 7.20 | Aperture Stop S | |
| 8 | −24.6368 | 1.40 | 27.79 | 1.74077 |
| 9 | 49.4961 | 1.70 | | |
| 10 | −44.0723 | 3.30 | 58.55 | 1.65160 |
| 11 | −21.6733 | 0.24 | | |
| 12 | 56.9313 | 3.90 | 52.64 | 1.74100 |
| 13 | −36.2890 | (d2) | | |
| 14 | −331.4266 | 1.60 | 49.60 | 1.77250 |
| 15 | 39.0571 | 1.00 | | |
| 16 | 57.2603 | 3.60 | 45.78 | 1.54814 |
| 17 | −58.8360 | (Bf) | | |

(Lens Group Data)

| Group | ST | Focal Length |
|---|---|---|
| G1 | 1 | −47.69852 |
| G2 | 11 | 30.63683 |
| G3 | 17 | −394.27034 |

(Variable Distances)

| β = | 0 | −0.5 | −1.0 |
|---|---|---|---|
| d1 = | 12.5000 | 12.3875 | 12.5000 |
| d2 = | 1.2000 | 16.3191 | 31.2385 |
| Bf = | 39.820 | 39.820 | 39.820 |
| TL = | 92.7572 | 107.7637 | 122.7957 |

(Values for Conditional Expressions)

(1) (−β) = 1.000
(2) |X1|/f2 = 0.980
(3) f2/(−f1) = 0.642
(4) f/TL = 0.431
(5) (−f1)/f = 1.192
(6) (−f3)/f = 9.857
(7) f2/f = 0.766
(8) |−X1|/f = 0.751

Figure 12A:
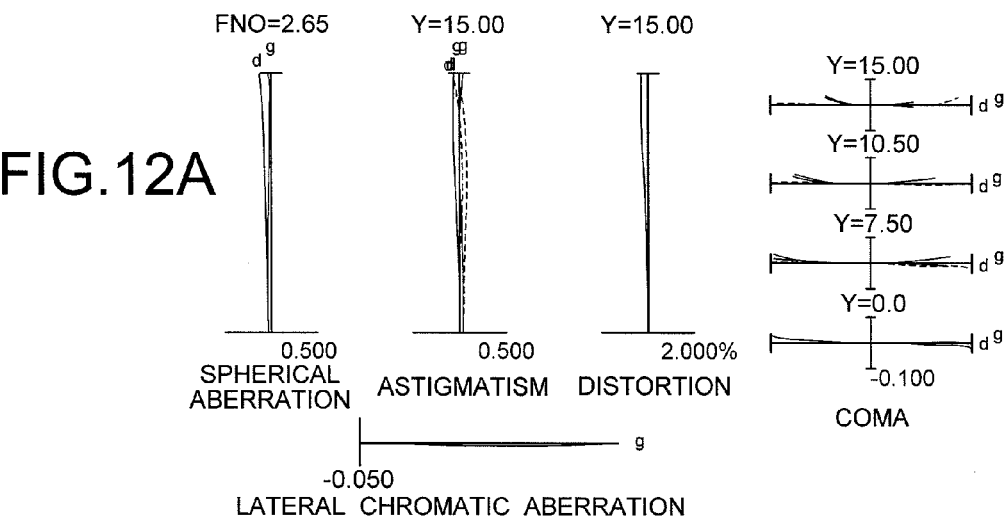
Figure 12B:
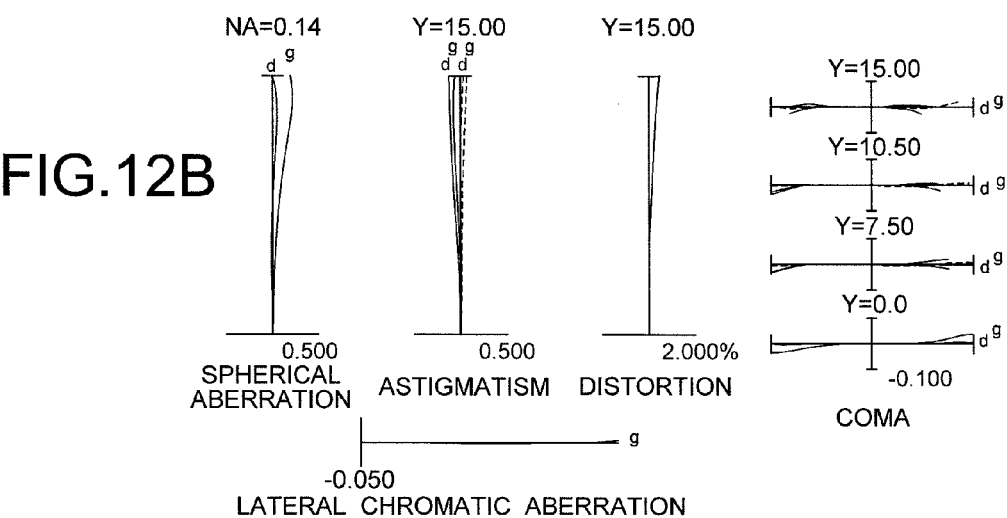
Figure 12C:
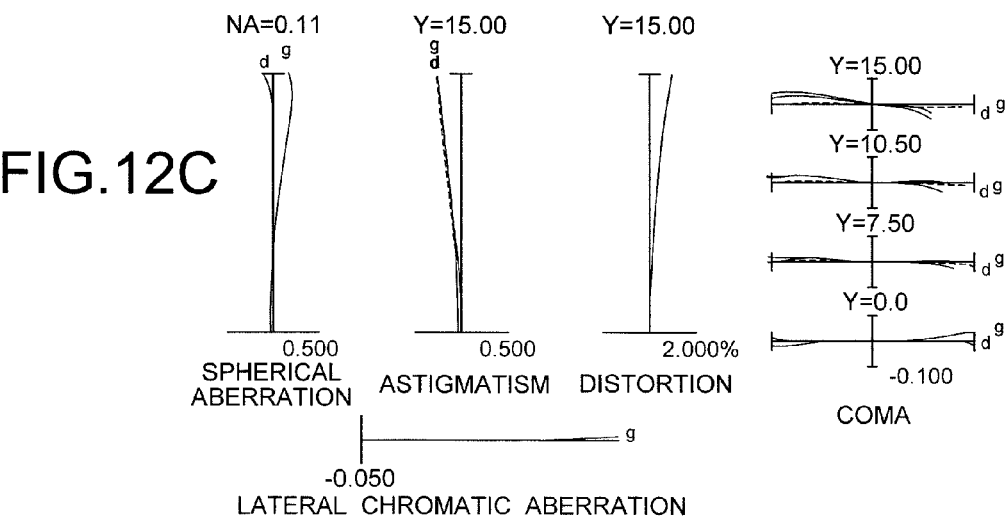

FIGS. 12A, 12B and 12C are diagrams of various aberrations in Example 6, in which FIG. 12A is the diagram of the various aberrations in an infinite-distance focusing state, FIG. 12B is a diagram of the various aberrations in a quasi-life-size-shooting-magnification (−0.5) state, and FIG. 12C is a diagram of the various aberrations in a life-size shooting magnification (−1.0) state.

As is apparent from various graphs, the optical system according to Example 6 of the present application shows superb optical performance as a result of good corrections to various aberrations over entire focusing range from an infinitely-distant-object-focusing state to a close-object-focusing state.

Example 7

FIG. 13 is a view showing a configuration of an imaging lens SL7 according to Example 7. In the imaging lens SL7 in FIG. 13, the first lens group G1 having negative refractive power on the whole is composed of, in order from the object side, five lens elements, i.e., a negative meniscus lens L11 with a convex surface facing the object side, a negative meniscus lens L12 with a convex surface facing the object side, a double convex lens L13, a double convex lens L14 and a double concave lens L15. The second lens group G2 having positive refractive power on the whole is composed of, in order from the object side, three lens elements such as an aperture stop S, a cemented lens constructed by a double concave lens L21 cemented with a double convex lens L22 and a double convex lens L23. The third lens group G3 having negative refractive power on the whole is composed of, in order from the object side, two lens elements such as a negative meniscus lens L31 with a convex surface facing the object side and a positive meniscus lens L32 with a concave surface facing the object side.

The following Table 7 shows values of various items of data in Example 7.

TABLE 7

(Specifications)

| | |
|---|---|
| f = | 40.00 |
| Bf = | 40.0 (constant) |
| FNO = | 2.80 |
| 2ω = | 39.14° |

(Lens Surface Data)

| i | r | d | νd | nd |
|---|---|---|---|---|
| 1 | 32.0128 | 2.00 | 46.48 | 1.58267 |
| 2 | 14.0363 | 2.71 | | |
| 3 | 49.2088 | 2.00 | 58.93 | 1.51823 |
| 4 | 26.0278 | 2.77 | | |
| 5 | 26.0000 | 2.65 | 27.51 | 1.75520 |
| 6 | −342.2396 | 2.54 | | |
| 7 | 25.0000 | 3.87 | 56.17 | 1.65100 |
| 8 | −36.8975 | 0.98 | | |
| 9 | −42.8752 | 1.18 | 30.13 | 1.69895 |
| 10 | 19.1868 | (d1) | | |
| 11 | 0.0000 | 3.50 | Aperture Stop S | |
| 12 | −17.2682 | 1.10 | 30.13 | 1.69895 |
| 13 | 72.9999 | 3.76 | 60.25 | 1.62041 |
| 14 | −19.8570 | 0.81 | | |
| 15 | 71.9505 | 3.20 | 47.93 | 1.71700 |
| 16 | −26.5053 | (d2) | | |
| 17 | 135.0005 | 1.10 | 54.89 | 1.67790 |
| 18 | 32.6890 | 1.40 | | |
| 19 | −346.0717 | 2.07 | 29.51 | 1.71736 |
| 20 | −77.0609 | (Bf) | | |

(Lens Group Data)

| Group | ST | Focal Length |
|---|---|---|
| G1 | 1 | −1977.71883 |
| G2 | 11 | 28.55584 |
| G3 | 17 | −123.78848 |

(Variable Distances)

| β = | 0 | −0.5 | −1.0 |
|---|---|---|---|
| d1 = | 2.2000 | 2.6745 | 4.1994 |
| d2 = | 1.0000 | 11.7699 | 22.5225 |
| Bf = | 40.000 | 40.000 | 40.000 |
| TL = | 80.8341 | 92.0784 | 104.3559 |

(Values for Conditional Expressions)

(1) (−β) = 1.000
(2) |X1|/f2 = 0.824
(3) f2/(−f1) = 0.014
(4) f/TL = 0.495
(5) (−f1)/f = 49.415
(6) (−f3)/f = 3.093
(7) f2/f = 0.713
(8) |−X1|/f = 0.588

Figure 14A:
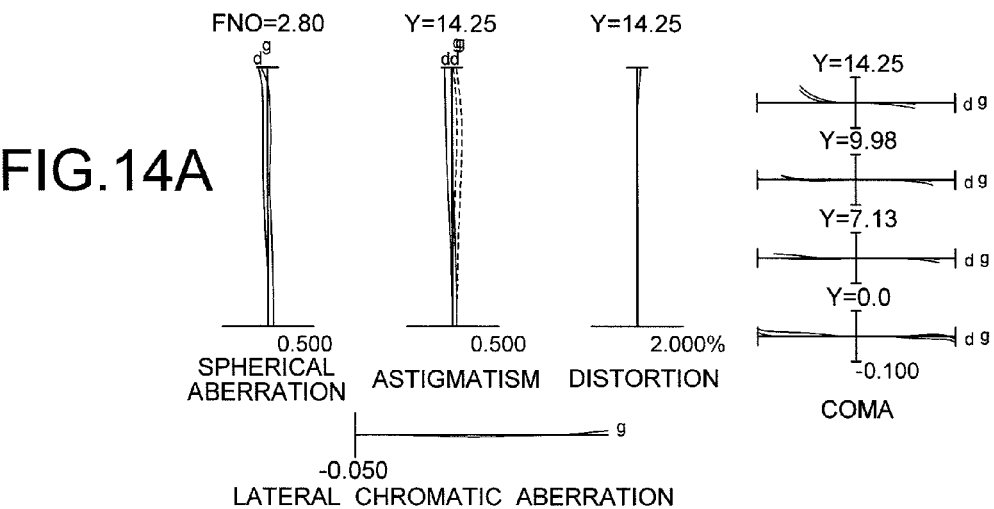
Figure 14B:
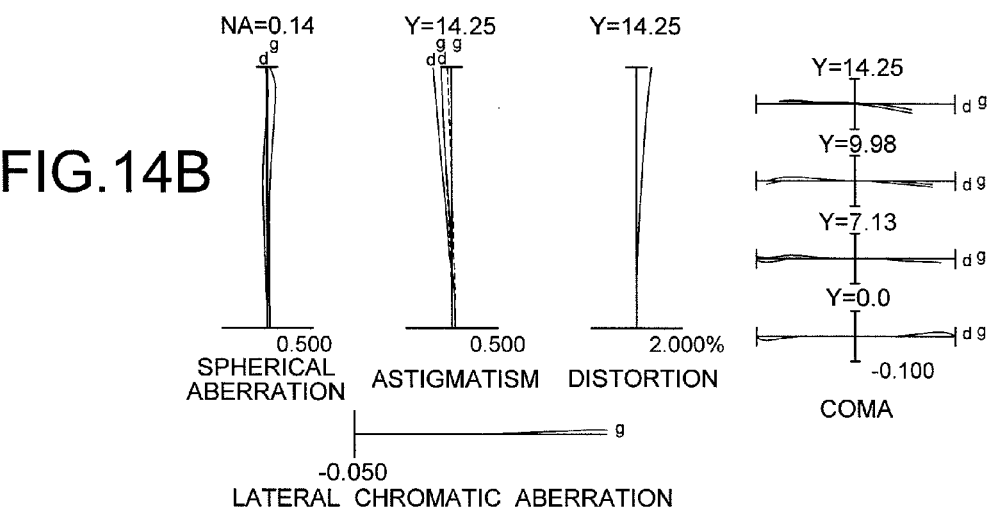
Figure 14C:
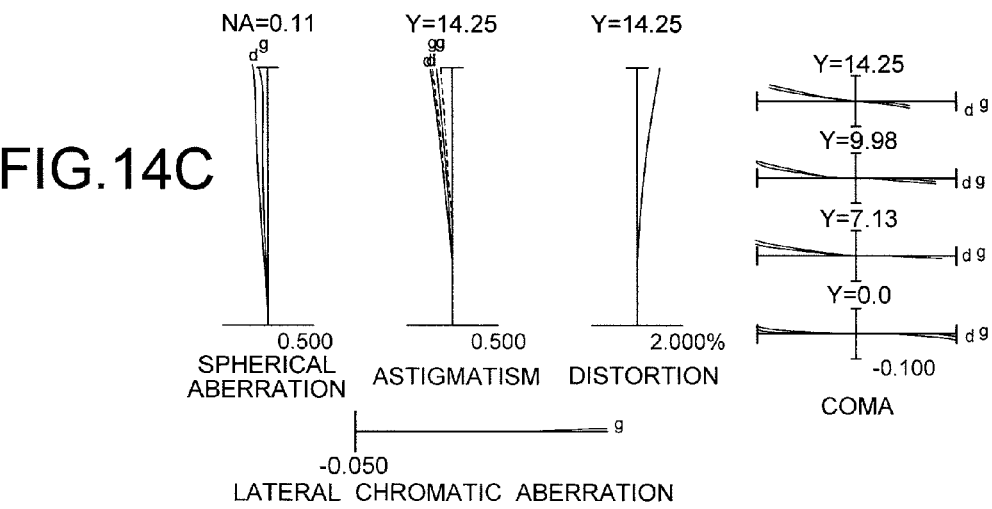

FIGS. 14A, 14B and 14C are diagrams of various aberrations in Example 7, in which FIG. 14A is the diagram of the various aberrations in an infinite-distance focusing state, FIG. 14B is a diagram of the various aberrations in a quasi-life-size-shooting-magnification (−0.5) state, and FIG. 14C is a diagram of the various aberrations in a life-size shooting magnification (−1.0) state.

As is apparent from various graphs, the optical system according to Example 7 of the present application shows superb optical performance as a result of good corrections to various aberrations over entire focusing range from an infinitely-distant-object-focusing state to a close-object-focusing state.

What is claimed is:

1. An imaging lens comprising, in order from an object side:
   a first lens group having negative refractive power;
   a second lens group having positive refractive power; and
   a third lens group having negative refractive power,
   upon focusing on a close object from an infinitely distant object, at least one of the first lens group and the second lens group being moved to the object side so that a distance between the first lens group and the second lens group varies, and the following conditional expressions being satisfied:

$$0.5 \leq (-\beta)$$

$$0.81 < |X1|/f2 < 1.20$$

where β denotes a shooting magnification upon focusing on the closest object, X1 is a moving amount of the first lens group, which comes to the maximum when focusing varies from an infinitely-distant-object focusing state to a life-size shooting magnification state, and f2 is a focal length of the second lens group.

2. The imaging lens according to claim 1, wherein the imaging lens satisfies the following conditional expression:

$$0.22 < f2/(-f1) < 0.90$$

where f1 denotes a focal length of the first lens group.

3. The imaging lens according to claim 1, wherein the imaging lens satisfies the following conditional expression:

$$0.20 < f/TL < 0.60$$

where f denotes a focal length of the whole system upon focusing on an infinitely distant object, and TL is a total lens length upon focusing on an infinitely distant object.

4. The imaging lens according to claim 1, wherein the imaging lens satisfies the following conditional expression:

$$0.20 < (-f1)/f < 3.00$$

where f1 denotes a focal length of the first lens group G1, and f denotes a focal length of the whole system upon focusing on an infinitely distant object.

5. The imaging lens according to claim 1, wherein the imaging lens satisfies the following conditional expression:

$$2.0 < (-f3)/f < 50.0$$

where f3 denotes a focal length of the third lens group G3, and f is a focal length of the whole system upon focusing on an infinitely distant object.

6. The imaging lens according to claim 1, wherein said imaging lens satisfies the following conditional expression:

$$0.40 < f2/f < 1.50$$

where f2 denotes a focal length of the second lens group G2, and f denotes a focal length of the whole system upon focusing on an infinitely distant object.

7. The imaging lens according to claim 1, wherein said imaging lens satisfies the following conditional expression:

$$0.40<|X1|/f<1.50$$

where f denotes a focal length of the whole system upon focusing on an infinitely distant object.

8. The imaging lens according to claim 1, wherein the first lens group includes at least one negative lens and at least one positive lens and is composed of two through five lenses on the whole.

9. The imaging lens according to claim 8, wherein the first lens group is configured so that at least one of the negative lens has a concave surface facing an image side.

10. The imaging lens according to claim 1, wherein the third lens group is fixed upon focusing.

11. An optical apparatus equipped with the imaging lens according to claim 1.

12. A method for manufacturing an imaging lens including, in order from an object side, a first lens group having negative refractive power, a second lens group having positive refractive power, and a third lens group having negative refractive power, the method comprising steps of:
  disposing at least one of the first lens group and the second lens group movably to the object side upon focusing from an infinitely distant object to a close object such that a distance between the first lens group and the second lens group varies; and
  disposing each lens group with satisfying the following conditional expressions:

$$0.5 \leq (-\beta)$$

$$0.81<|X1|/f2<1.20$$

where β denotes a shooting magnification upon focusing on the nearest object, X1 denotes a moving amount of the first lens group, which comes to the maximum when focusing varies from an infinitely-distant-object focusing state to a life-size-shooting-magnification state, and f2 is a focal length of the second lens group.

13. The method according to claim 12, further comprising a step of:
  disposing each lens group with satisfying the following conditional expression:

$$0.22<f2/(-f1)<0.90$$

where f1 denotes a focal length of the first lens group.

14. The method according to claim 12, further comprising a step of:
  disposing each lens group with satisfying the following conditional expression:

$$0.20<f/TL<0.60$$

where f denotes a focal length of the whole system upon focusing on an infinitely distant object, and TL is a total lens length upon focusing on an infinitely distant object.

15. The method according to claim 12, further comprising a step of:
  disposing each lens group with satisfying the following conditional expression:

$$0.20<(-f1)/f<3.00$$

where f1 denotes a focal length of the first lens group G1, and f denotes a focal length of the whole system upon focusing on an infinitely distant object.

16. The method according to claim 12, further comprising a step of:
  disposing each lens group with satisfying the following conditional expression:

$$2.0<(-f3)/f<50.0$$

where f3 denotes a focal length of the third lens group G3, and f is a focal length of the whole system upon focusing on an infinitely distant object.

17. The method according to claim 12, further comprising a step of:
  disposing each lens group with satisfying the following conditional expression:

$$0.40<f2/f<1.50$$

where f2 denotes a focal length of the second lens group G2, and f denotes a focal length of the whole system upon focusing on an infinitely distant object.

18. The method according to claim 12, further comprising a step of:
  disposing each lens group with satisfying the following conditional expression:

$$0.40<|X1|/f<1.50$$

where f denotes a focal length of the whole system upon focusing on an infinitely distant object.

* * * * *